(12) United States Patent
Rao et al.

(10) Patent No.: US 9,405,009 B2
(45) Date of Patent: Aug. 2, 2016

(54) NAVIGATION DATA STRUCTURE GENERATION AND DATA TRANSMISSION FOR OPTIMAL TIME TO FIRST FIX

(75) Inventors: Vyasaraj Guru Rao, Bangalore (IN); Sashidharan Maa, Bangalore (IN); Ge'rard Lachapelle, Calgary (CA)

(73) Assignee: ACCORD SOFTWARE & SYSTEMS PVT LTD., Bangalore, Karnataka (IN)

( * ) Notice: Subject to any disclaimer, the term of this patent is extended or adjusted under 35 U.S.C. 154(b) by 620 days.

(21) Appl. No.: 13/354,329

(22) Filed: Jan. 20, 2012

(65) Prior Publication Data
US 2013/0141278 A1 Jun. 6, 2013

(30) Foreign Application Priority Data
Dec. 5, 2011 (IN) .............. 4231/CHE/2011

(51) Int. Cl.
G01S 19/02 (2010.01)
G01S 19/01 (2010.01)
G01S 19/23 (2010.01)

(52) U.S. Cl.
CPC .............. *G01S 19/02* (2013.01); *G01S 19/01* (2013.01); *G01S 19/235* (2013.01)

(58) Field of Classification Search
USPC ............. 342/357.395, 357.39, 357.42
See application file for complete search history.

(56) References Cited

U.S. PATENT DOCUMENTS

| | | | |
|---|---|---|---|
| 5,225,842 A * | 7/1993 | Brown et al. | 342/357.46 |
| 5,712,899 A * | 1/1998 | Pace, II | 455/456.2 |
| 6,373,429 B1 | 4/2002 | Eschenbach | |
| 6,429,811 B1 * | 8/2002 | Zhao et al. | 342/357.66 |
| 6,651,000 B2 * | 11/2003 | van Diggelen et al. | 701/484 |
| 6,731,701 B2 | 5/2004 | Vorobiev et al. | |
| 7,239,271 B1 | 7/2007 | Vyas et al. | |
| 7,324,045 B2 | 1/2008 | Mo et al. | |
| 7,623,067 B2 | 11/2009 | Raman et al. | |
| 7,852,263 B2 * | 12/2010 | Henkel et al. | 342/357.395 |
| 2006/0187116 A1 * | 8/2006 | Uozumi | 342/357.06 |
| 2007/0257838 A1 | 11/2007 | Cheng | |

(Continued)

OTHER PUBLICATIONS

Neelakantan, Overview of Indian Satellite Navigation Programme, Oct. 18, 2010, India Space Research Organization, http://www.oosa.unvienna.org/pdf/icg/2010/ICG5/18october/05.pdf.*

(Continued)

*Primary Examiner* — Frank J McGue
(74) *Attorney, Agent, or Firm* — Ash Tankha; Lipton, Weinberger & Husick

(57) ABSTRACT

A method and system for transmitting navigation data to a satellite navigation receiver for reducing time to first fix is provided. A signal generation system generates a navigation data structure comprising a first sub-frame and a second sub-frame for accommodating selective ephemeris data, a third sub-frame for accommodating first parameters of almanac data, and a fourth sub-frame for accommodating a text message comprising second parameters of almanac data, and transmits the selective ephemeris data and the first and second parameters of almanac data to the satellite navigation receiver. The configuration of the navigation data structure enables the satellite navigation receiver to collect the navigation data in reduced time. Each satellite of a constellation simultaneously transmits distinct first parameters of the almanac data in the third sub-frame of the navigation data structure to the satellite navigation receiver, thereby allowing the satellite navigation receiver to receive collective almanac data in reduced time.

14 Claims, 22 Drawing Sheets

(56) References Cited

U.S. PATENT DOCUMENTS

2010/0085249 A1* 4/2010 Ferguson et al. ........ 342/357.09
2010/0090895 A1* 4/2010 Syrjarinne et al. ....... 342/357.15

OTHER PUBLICATIONS

Anghilieri et al, Ready to Navigate! A Methodology for the Estimation of the Time-to-First-Fix, Mar./Apr. 2010, InsideGNSS.*
Rao et al, Proposed LOS Signal Design for IRNSS to Reduce TTFF in a Single Frequency Receiver, Dec. 8-9, 2011, GNSS Signals 2011.*
Quinlan et al, Validation of Novel Navigation Signal Structures for Future GNSS Systems, 2004, IEEE.*
Ganeshan, Ionosphere Modelling in India for Satellite Navaigation Programme, Sep. 4-9, 2011.*
Vyasaraj, G, G. Lachapelle and S. B. Vijaykumar (2011), "Analysis of IRNSS over Indian Subcontinent," in Proceedings of ITM11, The Institute of Navigation, San Diego, Jan. 24-26, Session E5, 13 pages.
Lachapelle G. (2010) Advanced GNSS Theory and Applications, ENGO625 Course Notes Department of Geomatics Engineering, University of Calgary, Canada.
Kaplan, E D. and C.J Hegarty (2006), Understanding GPS: Principles and Applications, Second edition Artech House.
Galileo (2008), "Galileo Open Service Signal in Space Interface Control Document, OS SIS ICD," Draft 1, Feb. 2008 European Space Agency / European GNSS Supervisory Authority, http://www.gsa.europa.eu/go/galileo/os-sis-icd.
Navstar GPS Space Segment / Navigation User Interfaces Interface Control Document (ICD), Revision 200C, prepared and published for GPS JPO, revised Sep. 1997, ION, Salt Lake City, USA.
ARINC "Navstar GPS Space Segment / User Segment L5 Interface Control Document", ICD-GPS-705, Revision Two Dec. 2, 2002.
EGNOS Tran (2003), "The use of AIS as a local augmentation system for EGNOS in a maritime environment", Datasheet EGNOS Tran 2003.
Navstar GPS Space Segment / Navigation User Interfaces Interface Specification (IS), IS-GPS-200, Revision E, Jun. 8, 2010.
Navstar GPS Space Segment/Navigation User Interface Control Document (ICD) Revision 200C.
Borre et al. A Software-Defined GPS and Galileo Receiver: A Single-Frequency Approach (Applied and Numerical Harmonic Analysis), Birkhauser (Dec. 2006).
Galileo "Signal in Space Interface Control Document" OS SIS ICD, Issue 1.1 (Sep. 2010).
Majithiya et al. "Indian Regional Navigation Satellite System" Inside GNSS (Jan./Feb. 2011).
Neetha et al. "The IRNSS Navigation Message" Journal of Spacecraft Technology, vol. 21, No. 2, pp. 41-51 (Jan. 2011).
Digdarsini et al, "Design, Implementation and Realization of Navigation Signal Generation Unit for IRNSS payload," Journal of Spacecraft Technology, vol. 21, No. 2 pp. 25-29 (Jul. 2011).
Tirmal et al. "Optimal Scheduling for IRNSS Navigation Messages" International COnference on Advances in Modeling Optimization and COmputing (Dec. 2011).

* cited by examiner

| | | |
|---|---|---|
| NAVIGATION DATA SPECIFICATIONS | ENCODING SCHEME | CONVOLUTIONAL ENCODING SCHEME |
| | CODE RATE | ½ |
| | CONSTRAINT LENGTH | 7 |
| | GENERATOR POLYNOMIAL | G1 - 171o<br>G2 - 133o |
| | DATA RATE | 100 symbols per second (sps) |
| | SYNCH WORD | 0xB70 |
| SPREADING CODE SPECIFICATIONS | TYPE | GOLD CODE |
| | CHIPS | 1023 |
| | CHIPPING RATE | 1.023 Mbps |
| | CODE LENGTH | 1 ms |
| CARRIER SPECIFICATIONS | CARRIER FREQUENCY | L5 - 1176.45 MHz |
| | BANDWIDTH | 2 MHz |
| | MODULATION | BPSK |
| | POWER LEVEL | -157 dBW |

FIG. 5

| | | |
|---|---|---|
| SV ID | 6 | SV PRN NUMBER OF THE TRANSMITTING SATELLITE |
| WN | 10 | WEEK NUMBER |
| Tgd | 8 | GROUP DELAY |
| toc | 16 | CLOCK DATA REFERENCE TIME OF WEEK |
| Af0 | 8 | SV CLOCK CORRECTION PARAMETERS |
| Af1 | 16 | |
| Af2 | 22 | |
| Crs | 16 | AMPLITUDE OF SINE HARMONIC CORRECTION TERM TO THE ORBIT RADIUS |
| Cuc | 16 | AMPLITUDE OF COSINE HARMONIC CORRECTION TERM TO ARGUMENT OF LATITUDE |
| Cus | 16 | AMPLITUDE OF SINE HARMONIC CORRECTION TERM TO ARGUMENT OF LATITUDE |
| $M_0$ | 32 | MEAN ANOMALY AT REFERENCE TIME |
| e | 32 | ECCENTRICITY |
| $\sqrt{A}$ | 32 | SQUARE-ROOT OF SEMI-MAJOR AXIS |
| ISC-L5 | 8 | GROUP DELAY DIFFERENTIAL CORRECTION TERMS |
| IODE | 8 | ISSUE OF DATA EPHEMERIS |
| SPARE | 5 | SPARE BITS |

FIG. 7A

| | | |
|---|---|---|
| SV ID | 6 | SV PRN NUMBER OF THE TRANSMITTING SATELLITE |
| $T_{oe}$ | 16 | REFERENCE TIME EPHEMERIS |
| $\Omega_0$ | 32 | LONGITUDE OF ASCENDING NODE OF THE ORBIT PLANE AT REFERENCE TIME |
| $I_0$ | 32 | INCLINATION ANGLE OF THE ORBIT PLANE AT REFERENCE TIME |
| $\omega$ | 32 | ARGUMENT OF PERIGEE |
| $\Omega_{dot}$ | 24 | RATE OF RIGHT ASCENSION |
| $I_{dot}$ | 14 | RATE OF INCLINATION ANGLE |
| $\Delta n$ | 16 | MEAN MOTION DIFFERENCE FROM THE COMPUTED VALUE |
| $C_{ic}$ | 16 | AMPLITUDE OF COSINE HARMONIC CORRECTION TERM TO THE ANGLE OF INCLINATION |
| $C_{is}$ | 16 | AMPLITUDE OF SINE HARMONIC CORRECTION TERM TO THE ANGLE OF INCLINATION |
| $C_{rs}$ | 16 | AMPLITUDE OF COSINE HARMONIC CORRECTION TERM TO THE ORBIT RADIUS |
| IODE | 8 | ISSUE OF DATA EPHEMERIS |
| ISC-S | 8 | GROUP DELAY DIFFERENTIAL CORRECTION TERMS |
| $\alpha_0$ | 8 | IONOSPHERE CORRECTION PARAMETER |
| SPARE | 7 | SPARE BITS |

FIG. 7B

| | | |
|---|---|---|
| SV ID | 6 | SV PRN NUMBER OF THE SATELLITE WHOSE ALMANAC DATA APPEARS IN THE SUB-FRAME |
| $WN_a$ | 10 | ALMANAC REFERENCE WEEK NUMBER |
| e | 16 | ECCENTRICITY |
| $t_{oa}$ | 8 | TIME OF ALMANAC |
| $I_o$ | 32 | INCLINATION ANGLE |
| $\Omega_0$ | 16 | LONGITUDE OF ASCENDING NODE OF THE ORBIT PLANE AT REFERENCE TIME |
| $\sqrt{A}$ | 16 | SQUARE-ROOT OF SEMI-MAJOR AXIS |
| $\Omega_{dot}$ | 16 | RATE OF RIGHT ASCENSION |
| $\omega$ | 16 | ARGUMENT OF PERIGEE |
| $M_0$ | 16 | MEAN ANOMALY AT REFERENCE TIME |
| $Af_0$ | 11 | SV CLOCK CORRECTION PARAMETERS |
| $Af_1$ | 11 | |
| Health | 2 | SV HEALTH |
| $\alpha_1-\alpha_3$ | 24 | IONOSPHERE CORRECTION PARAMETERS |
| $\beta_0-\beta_3$ | 32 | |
| SPARE | 19 | SPARE BITS |

FIG. 7C

| Field | Bits | Description |
|---|---|---|
| SV ID | 6 | SV PRN NUMBER OF THE SATELLITE WHOSE ALMANAC DATA APPEARS IN THE SUB-FRAME |
| MSG ID | 8 | MESSAGE ID INDICATING THE TYPE OF THE TEXT MESSAGE (1 – UTC CORRECTIONS MESSAGE) |
| $A_0$ | 32 | CONSTANT TERM OF UTC CORRECTION POLYNOMIAL |
| $A_1$ | 24 | FIRST ORDER TERM OF UTC CORRECTION POLYNOMIAL |
| $\Delta t_{LS}$ | 8 | SECOND COUNT BEFORE LEAP SECOND ADJUSTMENT |
| $t_{ot}$ | 8 | UTC DATA TIME REFERENCE TIME OF WEEK |
| $WN_{ot}$ | 8 | UTC DATA REFERENCE WEEK NUMBER |
| $WN_{LSF}$ | 8 | WEEK NUMBER OF LEAP SECOND ADJUSTMENT |
| DN | 3 | DAY NUMBER AT THE END OF WHICH A LEAP SECOND ADJUSTMENT BECOMES EFFECTIVE. |
| $\Delta t_{LSF}$ | 8 | LEAP SECOND COUNT AFTER LEAP SECOND ADJUSTMENT |
| TLM | 10 | TELEMETRY BITS |
| SPARE | 128 | SPARE BITS |

FIG. 7D

| Tx SATELLITE (SV) | TIME | SVID DATA CONTENT OF ALMANAC ||||||| 
| --- | --- | --- | --- | --- | --- | --- | --- | --- |
| | | SV1 | SV2 | SV3 | SV4 | SV5 | SV6 | SV7 |
| 1 | $t_0$ | 1 | 2 | 3 | 4 | 5 | 6 | 7 |
| 2 | $t_0+24$ | 2 | 3 | 4 | 5 | 6 | 7 | 1 |
| 3 | $t_0+48$ | 3 | 4 | 5 | 6 | 7 | 1 | 2 |
| 4 | $t_0+72$ | 4 | 5 | 6 | 7 | 1 | 2 | 3 |
| 5 | $t_0+96$ | 5 | 6 | 7 | 1 | 2 | 3 | 4 |
| 6 | $t_0+120$ | 6 | 7 | 1 | 2 | 3 | 4 | 5 |
| 7 | $t_0+144$ | 7 | 1 | 2 | 3 | 4 | 5 | 6 |
| 1 | $t_0+168$ | 1 | 2 | 3 | 4 | 5 | 6 | 7 |

FIG. 9

SESSION | VIEW | PLOTS | MESSAGES | SOFTWARE UPGRADE | TOOLS | WINDOWS | HELP       ✕

| CHANNEL NUMBER | SATELLITE ID | STATUS | CONSTEL | EPHEMERIS | ALMANAC | RF | C/NO RATIO (dB-Hz) | PR QUALITY | DPR QUALITY | HEALTH |
|---|---|---|---|---|---|---|---|---|---|---|
| 1 | 01 | TRA | N | N | Y | 1 | 41 | B | B | G |
| 2 | 24 | TRA | Y | Y | Y | 1 | 45 | G | G | G |
| 3 | 14 | TRA | Y | Y | Y | 1 | 37 | G | G | G |
| 4 | 12 | ACQ | N | N | Y | 1 | 0 | B | B | G |
| 5 | 04 | TRA | Y | Y | Y | 1 | 46 | G | G | G |

SOLUTION TIME
   291458.750 S

ECEF POSITION
X  131207.38 m
Y  6073457.65 m
Z  1420761.14 m

ECEF VELOCITY
X  -0.0384 m/s
Y  -0.1300 m/s
Z  0.0128 m/s

GEO POSITION

LATITUDE: 12° 57' 18.7344"
LONGITUDE: 77° 38' 13.7833"
ALTITUDE  825.73 m

DOP
HDOP  5.13
PDOP  5.16

USER CLOCK BIAS
   -15.39 m
CG CLOCK BIAS
   -2.90 m

FIG. 16

| SUB-FRAME SYNCHRONIZATION WITH DIFFERENT SUB-FRAME-IDS | $T_{eph}$ | |
|---|---|---|
| | GPS (s) | IRNSS (s) |
| 1 | 18 | 12 |
| 2 | 30 | 24 |
| 3 | 30 | 24 |
| 4 | 30 | 12 |
| 5 | 24 | - |

NAVIGATION DATA STRUCTURE GENERATION AND DATA TRANSMISSION FOR OPTIMAL TIME TO FIRST FIX

CROSS REFERENCE TO RELATED APPLICATIONS

This application claims the benefit of non-provisional patent application number 4231/CHE/2011 titled "Navigation Data Structure Generation And Data Transmission For Optimal Time To First Fix", filed on Dec. 5, 2011 in the Indian Patent Office.

The specification of the above referenced patent application is incorporated herein by reference in its entirety.

BACKGROUND

The advent of autonomous regional satellite based navigation systems has enabled some countries to cover their territorial footprint and the footprint of their surrounding areas. The purpose of a regional satellite based navigation system, such as a global navigation satellite system (GNSS), is to cater to the needs of specific users, for example, the military, for military applications using a precision service (PS) and civilian users, for example, for civilian applications using a standard positioning service (SPS). For example, India is planning to deploy an autonomous regional satellite based navigation system, namely, the Indian regional navigational satellite system (IRNSS), for surveying, telecommunication, transportation, identifying disaster locations and public safety, etc. The IRNSS will deploy a satellite constellation comprising seven satellites, of which three satellites are in geostationary orbits and four satellites are in geosynchronous orbits.

A number of issues need to be addressed in the design of a satellite navigation system for ensuring the efficiency and robustness of the satellite navigation system, for example, sensitivity improvements, jamming margins, robustness towards spoofing, multipath related improvements, time to first fix (TTFF), etc. One design parameter that needs to be optimized is the TTFF parameter, which is a measure of time needed by a satellite navigation receiver to acquire satellite signals and navigation data, and calculate a position solution, referred to as a "fix". The TTFF parameter directly influences the efficiency of position tracking by the satellite navigation receiver.

The TTFF parameter is an important receiver specification parameter that serves as a yardstick for comparing satellite navigation receivers from different manufacturers. In order to process a navigation signal emanating from a satellite, a global positioning system (GPS) L1 frequency receiver first establishes a lock on code and carrier frequency. Subsequently, in the lock condition, navigation data from the satellite is demodulated. Conventional satellite navigation receivers require a minimum of four satellites to compute the user navigation solution based on navigation measurements, for example, pseudorange measurements, delta range measurements, etc., and satellite state vectors, for example, the position of the satellite position, the velocity of the satellite, etc. For an optimal TTFF performance, it is necessary that the time taken for computing navigation measurements and subsequent navigation data collection is minimal. Typically, methods for reducing TTFF have focused on reducing the time required to acquire and lock the navigation signal, assisting the satellite navigation receiver with navigation data on a separate satellite link, etc. However, these methods are generally expensive in terms of deployment costs, complexity of the satellite navigation receiver, etc. Furthermore, conventional methods for reducing TTFF have often been ineffective in processing navigation signals for reduction of line of sight (LOS) TTFF.

A typical global navigation satellite system (GNSS) signal may be characterized by the following equation:

$$s(t)=c(t)*[r(t)\oplus d(t)]$$

where the parameter $s(t)$ refers to an output GNSS signal at a time instant t, the parameter $r(t)$ refers to a ranging code at the time instant t, the parameter $c(t)$ refers to a frequency of operation at the time instant t, and the parameter $d(t)$ refers to the navigation data transmitted by each satellite.

The navigation data transmitted by each satellite can be grouped into ephemeris data and almanac data. The ephemeris data comprises precise clock and Keplerian parameters, which are typically updated once every two hours. Typically, the ephemeris data or ephemerides are transmitted periodically once every two hours. The almanac data provides a coarse estimate of a satellite orbit, which is primarily used for satellite visibility computations. The almanac data also comprises ionosphere delay estimation coefficient for single frequency users, for example, GPS L1 users. The almanac data typically changes once in a day. The satellite state vectors of a satellite computed using the ephemeris data are used for estimation of a user position and velocity.

The satellite navigation receivers of conventional satellite navigation systems have generally been constrained by the amount of time taken for collecting the ephemeris data and the almanac data that constitute the navigation data. The delay in collecting the navigation data translates to multiple delays, for example, delays in computing satellite visibility, delays in estimation of ionosphere delay estimation coefficients, delays in cross-correlation detection based on the range estimated using the almanac data and an integrity check specified by the federal aviation administration (FAA) for beta-3 civil aviation receivers, etc. Conventional satellite navigation receivers take a relatively long time, for example, about 12.5 minutes to collect the almanac data for a single frequency user. This delays the estimation of ionosphere error, which is an important parameter for estimation of the position of the satellite.

The typical time taken by a user in open sky conditions to collect ephemeris data and almanac data from the global positioning system (GPS) and the global navigation satellite system (GLONASS) is recorded. The ephemeris data collection time in the GLONASS is, for example, about 30 seconds, and the ephemeris data collection time in a GPS is, for example, about 30 seconds. The almanac data collection time in a GLONASS is, for example, about 150 seconds (s), while the almanac data collection time in a GPS is, for example, about 750 seconds.

Furthermore, a conventional satellite navigation system such as the global positioning system (GPS) transmits the navigation (NAV) data, for example, as "sub-frames", while the GLONASS transmits the NAV data, for example, as "strings". In GPS, Keplerian parameters are transmitted as a part of the navigation data while in GLONASS, the absolute state vectors of a satellite are transmitted. Existing GPS based systems employ an L1 sub-frame structure, with the first three sub-frames constituting the ephemeris data and the last two sub-frames dedicated to the almanac data. Each sub-frame contains 10 words and each word has 24 navigation data bits and 6 parity bits. The use of 6 parity bits per word translates to 60 parity bits per sub-frame, effectively constraining the data bandwidth and delaying the time to first fix. The data bits are transmitted at 50 bits per second (bps). Therefore, one complete sub-frame is transmitted in 30 seconds. For every 24 bits, six redundant bits are transmitted. This constrains the time taken for the collection of the ephemeris data and delays the TTFF.

Furthermore, in each sub-frame, existing words and bits, for example, telemetry (TLM) data, hand over word (HOW) data, sub-frame identifier, etc., need to be transmitted. The almanac data is transmitted in two sub-frames, for example, sub-frames 4 and 5. In addition, the almanac data comprises ionosphere correction terms and coordinated universal time (UTC) parameters. Further, in case of current almanac transmission methods deployed in GPS, at any given instant of time, all satellites transmit the same information as part of sub-frames 4 and 5. The sub-frames 4 and 5 transmit almanac data for all the 25 pages with each almanac page comprising the almanac data of a particular satellite. Furthermore, with the current scheme of almanac data transmission, as for example in GPS based systems, it takes about 168 seconds for a seven-satellite satellite navigation system to collect almanac data. This delays the ionosphere error computation and thus delays accurate positioning in a satellite navigation receiver. Moreover, parameters such as UTC parameters compound the delay and bandwidth overhead since the UTC parameters need not be transmitted very frequently for computation of the user's position.

A navigation (NAV) data structure of the Galileo GNSS adopts a sub-frame architecture similar to that of a GPS based system. The navigation data structure uses a 12 sub-frame structure with each sub-frame comprising a series of pages. Each page comprises a synchronization pattern, and navigation data symbols. Each navigation data symbol comprises a navigation data word and tail bits. The navigation data word comprises a 24-bit cyclic redundancy check (CRC) code. Further, as in the case of other modern GNSS systems, the Galileo adopts a half rate forward error correction (FEC) encoding. For the Galileo GNSS, the integrity bits are added to a packet of navigation data. However, Galileo uses a navigation data structure with a larger number of sub-frames and imposes constraints in terms of memory requirements and an increased amount of time required for transmitting the complete navigation data structure.

The GPS L5 satellite navigation system is a global navigation satellite system that employs navigation data transmission based on the transmission of text messages at a predefined rate. Each text message is identified based on a message identifier (ID). GPS L5 uses a half rate forward error correction (FEC) encoding scheme with a baud rate of 100 symbols per second (sps). The signal transmitted from an L5 satellite is at a power level of, for example, about −157 decibel-watt (dBW). The GPS L5 system allows variation of frequency of text message transmission. However, the GPS L5 system continues to employ a five sub-frame structure and needs about 30 seconds for complete transmission of all the sub-frames of the navigation data structure.

Furthermore, the transmission of almanac data in a conventional GNSS, for example, a GPS based system comprises transmission of the same almanac data by all satellites in a constellation. For example, in a seven-satellite constellation employed by the Indian regional navigational satellite system (IRNSS), each satellite transmits the same almanac data at each time instant over a satellite channel. This increases the time overhead in almanac transmission and increases the almanac data collection time at the satellite frequency receiver, thereby delaying ionosphere estimation at the satellite navigation receiver. For example, in the IRNSS, seven almanac pages need to be transmitted as a part of the third sub-frame. On using an almanac transmission scheme typically used in GPS, it takes about 168 seconds to completely transmit the almanac data.

Hence, there is a long felt but unresolved need for a method and system that reduces the time to first fix in a satellite navigation receiver by enabling faster access to the ephemeris data and the almanac data.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and system disclosed herein addresses the above mentioned needs for reducing time to first fix (TTFF) in a satellite navigation receiver by enabling faster access to ephemeris data and almanac data of navigation data. The method and system disclosed herein enables reduction of the time to first fix, for example, in a single frequency satellite navigation receiver during transmission of the navigation data to the single frequency satellite navigation receiver. The method and system disclosed herein also enables transmission of almanac data to the satellite navigation receiver for reducing time required for collecting the almanac data by the satellite navigation receiver. The method and system disclosed herein provides a signal generation system that generates a navigation signal comprising navigation data in a navigation data structure that enables reduction of time to first fix in the satellite navigation receiver. The navigation data structure comprises a first sub-frame, a second sub-frame, a third sub-frame, and a fourth sub-frame.

The signal generation system configures the first sub-frame and the second sub-frame for accommodating selective ephemeris data of the navigation data. The configuration of the first sub-frame and the second sub-frame reduces the time for collecting the selective ephemeris data by the satellite navigation receiver. The signal generation system configures the third sub-frame for accommodating first parameters of almanac data of the navigation data. The first parameters of the almanac data accommodated in the third sub-frame of the generated navigation data structure comprise, for example, selective Keplerian parameters and ionosphere coefficients. The configuration of the third sub-frame reduces time for collecting the first parameters of the almanac data by the satellite navigation receiver. The signal generation system configures the fourth sub-frame for accommodating a text message comprising second parameters of the almanac data. The second parameters of the almanac data accommodated in the fourth sub-frame of the generated navigation data structure comprise, for example, coordinated universal time (UTC) parameters. The text message in the fourth sub-frame further comprises, for example, periodic non-positioning information extracted from the first sub-frame, the second sub-frame, and the third sub-frame. As used herein, the term "non-positioning information" refers to information in the navigation data structure that does not directly contribute to determination of a geographical position of a user. The periodic non-positioning information comprises, for example, telemetry data collected from the navigation data. The configuration of the fourth sub-frame reduces time for collecting the second parameters of the almanac data by the satellite navigation receiver.

Each of the first sub-frame, the second sub-frame, the third sub-frame, and the fourth sub-frame of the generated navigation data structure comprises, for example, 245 bits of navigation data and 24 bits of a cyclic redundancy check code for enabling validation of the navigation data. Furthermore, the signal generation system appends a synchronization word to each of the first sub-frame, the second sub-frame, the third sub-frame, and the fourth sub-frame during generation of the navigation data structure, for enabling frame synchronization and identification of a sub-frame boundary of each of the first sub-frame, the second sub-frame, the third sub-frame, and the fourth sub-frame. In an embodiment, the signal generation system verifies integrity of the navigation data in the first sub-frame, the second sub-frame, the third sub-frame, and the fourth sub-frame for determining accuracy of the navigation data.

The signal generation system transmits the selective ephemeris data, the first parameters of the almanac data, and the second parameters of the almanac data in the generated navigation data structure to the satellite navigation receiver in reduced time, thereby reducing the time to first fix in the satellite navigation receiver. Furthermore, the method and system disclosed herein enables each of multiple satellites of a constellation to simultaneously transmit distinct first parameters of the almanac data in the third sub-frame of the generated navigation data structure to the satellite navigation receiver, thereby allowing the satellite navigation receiver to receive collective almanac data in reduced time, which further reduces the time required to obtain a user position defined by the time to first fix in the satellite navigation receiver. The reduction of time for collecting the collective almanac data therefore further reduces the time to first fix in the satellite navigation receiver.

In an embodiment, the transmission of distinct first parameters of the almanac data by each of the satellites to the satellite navigation receiver comprises selecting a distinct almanac page of the almanac data for transmission by each of the satellites at each time instant. The selected distinct almanac page of the almanac data of each of the satellites constitutes the collective almanac data for the constellation. The method and system disclosed herein enable transmission of the selected distinct almanac pages of each satellite to the satellite navigation receiver via a separate satellite channel associated with each of the satellites of the constellation, thereby reducing the time for collecting the almanac data by the satellite navigation receiver.

Furthermore, the satellite navigation receiver disclosed herein receives navigation signals comprising navigation data in the generated navigation data structure from the satellites of the constellation. The satellite navigation receiver extracts the navigation data from the received navigation signals. The satellite navigation receiver determines a sub-frame boundary of each of the first sub-frame, the second sub-frame, the third sub-frame, and the fourth sub-frame in the generated navigation data structure, for example, by searching for a synchronization word in the generated navigation data structure. The satellite navigation receiver decodes each of the first sub-frame, the second sub-frame, the third sub-frame, and the fourth sub-frame in the generated navigation data structure for extracting the navigation data. The satellite navigation receiver performs a cyclic redundancy check operation on the extracted navigation data structure for validating the extracted navigation data. The satellite navigation receiver extracts the selective ephemeris data, the first parameters of the almanac data, and the text message comprising the second parameters of the almanac data from the validated navigation data based on a sub-frame identifier.

In an embodiment, the satellite navigation receiver analyzes timing components that constitute the time to first fix, and identifies timing delays at the satellite navigation receiver. As used herein, the term "timing delays" refers to the time taken by the satellite navigation receiver for completing each of the functional steps involved from a point of start of operation of the satellite navigation receiver to a point of computation of the geographical position of the user. The timing components comprise, for example, a time for boot-up of the satellite navigation receiver, a time for acquiring coarse estimates of a code phase and a carrier Doppler frequency of visible satellites of a constellation over satellite channels corresponding to the visible satellites, a time for performing bit synchronization of the satellite channels corresponding to the visible satellites, a time for extracting the navigation data from the generated navigation data structure contained in the navigation signals received from the visible satellites by the satellite navigation receiver, and a time for computing a geographical position of a user based on the extracted navigation data.

The satellite navigation receiver disclosed herein processes the selective ephemeris data and the first parameters of the almanac data extracted from the generated navigation data structure for determining positions of individual satellites of a constellation. The satellite navigation receiver uses the determined positions of the individual satellites for estimating the geographical position of a user.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

FIG. 5 exemplarily illustrates a table that specifies parameters and specifications for generating the navigation data structure.

FIGS. 7A-7D exemplarily illustrate tables describing data fields of the generated navigation data structure.

FIG. 9 exemplarily illustrates a table representing simultaneous transmission of distinct almanac data to a satellite navigation receiver at periodic time intervals by each satellite in a seven-satellite constellation.

FIG. 16 exemplarily illustrates a screenshot of a graphical user interface of the satellite navigation receiver that enables profiling of navigation data and determination of a geographical position of a user.

DETAILED DESCRIPTION OF THE INVENTION

Figure 1:
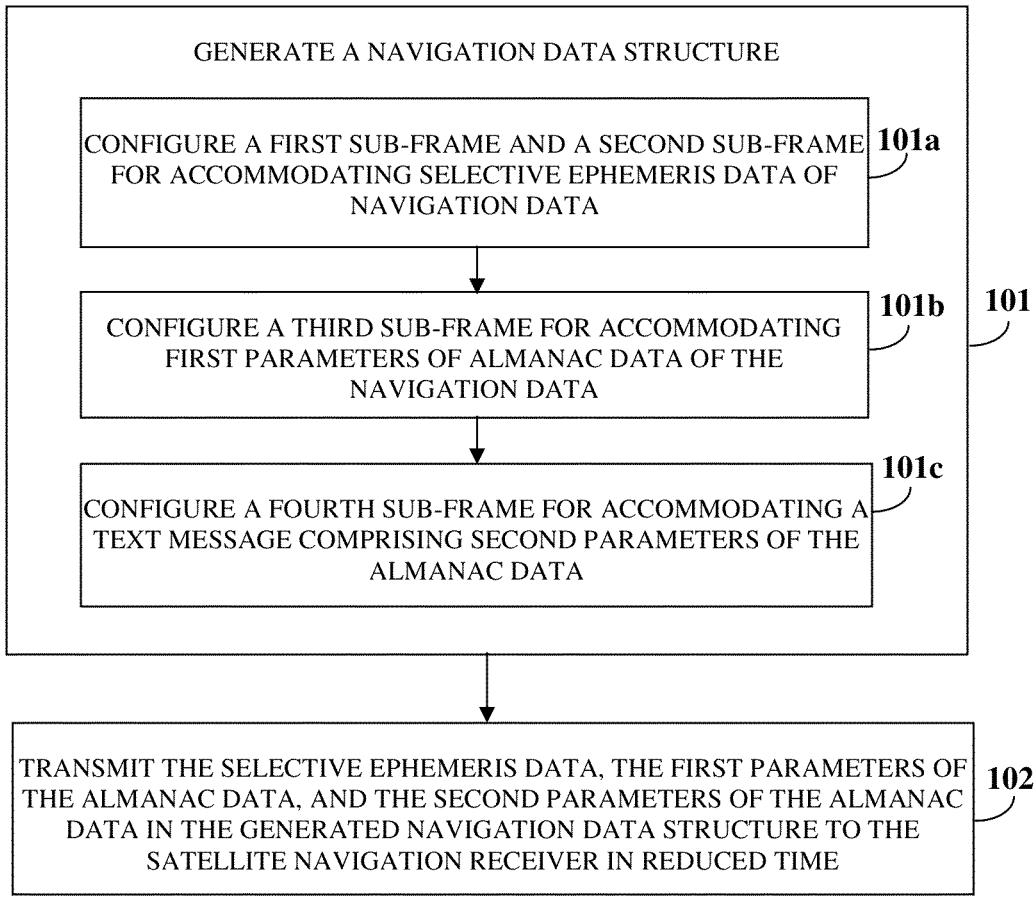
FIG. 1 illustrates a method for transmitting navigation data to a satellite navigation receiver for reducing time to first fix in the satellite navigation receiver.

FIG. 1 illustrates a method for transmitting navigation data to a satellite navigation receiver for reducing time to first fix (TTFF) in the satellite navigation receiver. The method disclosed herein enables transmission of the navigation data to a single frequency satellite navigation receiver for reducing time to first fix in the single frequency satellite navigation receiver. The method disclosed herein provides a signal generation system for generating 101a navigation data structure as exemplarily illustrated in FIG. 6. The navigation data structure comprises a first sub-frame, a second sub-frame, a third sub-frame, and a fourth sub-frame. The signal generation system configures 101a the first sub-frame and the second sub-frame for accommodating selective ephemeris data of the navigation data. As used herein, the term "selective ephemeris data" refers to essential ephemeris parameters that define orbital information of a satellite. The selective ephemeris data comprises, for example, a clock data reference time of week (TOW), a reference time ephemeris parameter, clock correction parameters, Keplerian parameters, group delay differential correction terms, etc.

The signal generation system selects all the parameters that completely define the ephemeris data. The signal generation system moves redundant information, for example, telemetry data bits, which are not directly useful to the determination of a geographical position of a user, to a text message in the fourth sub-frame. That is, the signal generation system collects some of the repeated or redundant information from an existing sub-frame structure of the ephemeris data, and moves the redundant information to the text message defined in the fourth sub-frame.

Further, the signal generation system discards parity bits typically used in a sub-frame of a navigation data structure of a global navigation satellite system (GNSS) that verify the integrity of the navigation data. The parity bits are extraneous to the navigation data structure since a cyclic redundancy check code that performs integrity validation of a complete sub-frame is implemented by the system disclosed herein. Therefore, the parity bits may be removed to avoid unnecessary data overhead in the navigation data structure. The signal generation system employs a 24 bit cyclic redundancy code (CRC) for a complete sub-frame for performing error detection on the data bits in the sub-frame, thereby eliminating the need for 6 parity bits for every 24 navigation data bits, that is, for every word in the sub-frame as used in a typical GPS based GNSS system. This saves, for example, 36 bits (60-24) per sub-frame. Further, this leads to an overall reduction in the length of the sub-frame when compared with a typical GNSS system.

The retention of all the essential data fields that define the ephemeris data ensures backward compatibility with a typical GNSS system, for example, the global positioning system (GPS), the global navigation satellite system (GLONASS), etc. The signal generation system optimally groups the ephemeris parameters in the first sub-frame and the second sub-frame of the generated navigation data structure. The configuration of the first sub-frame and the second sub-frame reduces time for collecting the selective ephemeris data by the satellite navigation receiver, since the time for transmission of the first sub-frame and the second sub-frame is reduced by the reduction in the length of each sub-frame.

The signal generation system configures 101b the third sub-frame for accommodating first parameters of almanac data of the navigation data. The first parameters of the almanac data accommodated in the third sub-frame of the generated navigation data structure comprise selective Keplerian parameters, for example, eccentricity of an orbit of the satellite, inclination angle, square-root of a semi-major axis of the orbit, rate of right ascension, etc., and ionosphere coefficients, for example, ionosphere correction parameters. The configuration of the third sub-frame reduces time for collecting the first parameters of the almanac data by the satellite navigation receiver.

The signal generation system configures 101c the fourth sub-frame for accommodating a text message comprising second parameters of the almanac data. The second parameters of the almanac data accommodated in the fourth sub-frame of the generated navigation data structure comprise, for example, coordinated universal time (UTC) parameters such as the constant term of a UTC correction polynomial, a UTC data reference week number, etc. The text message in the fourth sub-frame further comprises periodic non-positioning information extracted from the first sub-frame, the second sub-frame, and the third sub-frame. As used herein, the term "non-positioning information" refers to information in the navigation data structure that does not directly contribute to determination of a geographical position of a user. The periodic non-positioning information comprises, for example, telemetry data collected from the navigation data.

The text message in the fourth sub-frame further comprises redundant bits collected from the first sub-frame, the second sub-frame, and the third sub-frame. The text message uses a message identifier for indicating the type of the text message. The configuration of the fourth sub-frame reduces the time for collecting the second parameters of the almanac data by the satellite navigation receiver. In an embodiment, the signal generation system optimally modifies the length of the data fields in the generated navigation data structure that may be used, for example, to provide a satellite maintenance status or health and that are not essential to the determination of the geographical position of a user. The signal generation system generates the navigation data structure such that the major existing data fields that are used in existing satellite navigation systems such as the global positioning system (GPS) are not compromised. The signal generation system also performs optimal structuring of the navigation data in the generated navigation data structure and enables reduction of the collection time of the ephemeris data ($T_{eph}$) for achieving an optimal TTFF, for example, in open-sky conditions.

Each of the first sub-frame, the second sub-frame, the third sub-frame, and the fourth sub-frame comprises 245 bits of the navigation data and 24 bits of a cyclic redundancy check (CRC) code for enabling validation of the navigation data. The signal generation system verifies the integrity of the navigation data in the first sub-frame, the second sub-frame, the third sub-frame, and the fourth sub-frame for determining accuracy of the navigation data. The signal generation system employs the CRC code and appends CRC check bits to the navigation data structure for verifying the integrity of the navigation data.

In an embodiment, the signal generation system implements half rate forward error correction (FEC) encoding with 100 symbols per second (sps), and applies a spreading code of 1023 chips that results in the generation of 1023000 chips per millisecond. The specifications for generating the navigation data structure are exemplarily illustrated and disclosed in the detailed description of FIG. 5. The base signal power level from a satellite is, for example, −157 decibel watt (dBW) for a standard positioning service (SPS) operation. Furthermore, the signal generation system appends a synchronization word to each of the first sub-frame, the second sub-frame, the third sub-frame, and the fourth sub-frame during generation of the navigation data structure for enabling frame synchronization and identification of a sub-frame boundary of each of the first sub-frame, the second sub-frame, the third sub-frame, and the fourth sub-frame.

The signal generation system transmits 102 the selective ephemeris data, the first parameters of the almanac data, and the second parameters of the almanac data in the generated navigation data structure to the satellite navigation receiver in reduced time, thereby reducing the time to first fix in the satellite navigation receiver.

The satellite navigation receiver receives navigation signals comprising the navigation data in the generated navigation data structure from multiple satellites of a constellation. For example, the single frequency satellite navigation receiver receives navigation signals from seven satellites of a seven-satellite constellation associated with the Indian regional navigational satellite system (IRNSS). The satellite navigation receiver extracts the navigation data from the received navigation signals. The satellite navigation receiver determines a sub-frame boundary of each of the first sub-frame, the second sub-frame, the third sub-frame, and the fourth sub-frame in the generated navigation data structure, for example, by searching for a synchronization word in the generated navigation data structure. The synchronization word is, for example, a string of data bits with a predetermined value.

The satellite navigation receiver decodes each of the first sub-frame, the second sub-frame, the third sub-frame, and the fourth sub-frame in the generated navigation data structure for extracting the navigation data. The satellite navigation receiver performs a cyclic redundancy check operation on the extracted navigation data for validating the extracted navigation data. The satellite navigation receiver extracts the selective ephemeris data, the first parameters of the almanac data, and the text message comprising the second parameters of the almanac data from the validated navigation data based on a sub-frame identifier as disclosed in the detailed description of FIG. 10. The satellite navigation receiver processes the selective ephemeris data and the first parameters of the almanac data extracted from the generated navigation data structure for determining positions of individual satellites of a constellation. The satellite navigation receiver uses the determined positions of the individual satellites for estimating a geographical position of a user.

In an embodiment, the satellite navigation receiver analyzes timing components that constitute the time to first fix and identifies timing delays at the satellite navigation receiver. As used herein, the term "timing delays" refers to the time taken by the satellite navigation receiver for completing each of the functional steps involved from a point of start of operation of the satellite navigation receiver to a point of computation of a geographical position of the user.

The timing components comprise, for example, a time for boot-up of the satellite navigation receiver and a time for acquiring coarse estimates of a code phase and a carrier Doppler frequency of visible satellites of a constellation over satellite channels corresponding to the visible satellites. The term "code phase" refers to a phase value of a ranging code, for example, a pseudorandom number code. The term "carrier Doppler frequency" refers to a frequency shift caused by the rate of change in range with reference to a satellite and the satellite navigation receiver. Therefore, the coarse estimation of the code phase and the carrier Doppler frequency enables identification of visible satellites for initiating collection of the navigation data. The timing components further comprise, for example, a time for performing bit synchronization of the satellite channels corresponding to the visible satellites, a time for extracting the navigation data from the generated navigation data structure contained in the navigation signals received from the visible satellites by the satellite navigation receiver, and a time for computing a geographical position of a user based on the extracted navigation data.

In an experiment, the time taken by each of the individual functional components of a single frequency satellite navigation receiver is analyzed. The experiment establishes the time associated with each functional component in the single frequency satellite navigation receiver and the need for optimal navigation signal transmission and almanac data streaming which is addressed by the method and system disclosed herein. A test apparatus used to measure the different timing components comprises a single frequency satellite navigation receiver that is connected to a GPS or a GLONASS based antenna and exposed to the open sky. A cathode ray oscilloscope (CRO) is connected to a boot pin of a digital signal processor (DSP) to profile the application boot time. The satellite navigation receiver, which outputs the data, for example, in the recommended standard (RS) 232 format, is plugged to a test console, for example, a laptop or another computing device provided with a graphical user interface. The graphical user interface is used as a platform to profile functional parameters of the satellite navigation receiver. The graphical user interface is used as a tool to profile the receiver status of various satellite channels.

On powering on the satellite navigation receiver, the satellite navigation receiver takes a finite time to load programs of a navigation data processor of the satellite navigation receiver and to display a first set of data on the test console. This time resolves into two parts, that is, a boot-up time "$T_b$" and communication latency "$T_a$". The boot-up time $T_b$ characterizes the time associated with booting up of a particular application and is dependent on an application software of the satellite navigation receiver. The boot-up time $T_b$ is applicable only at power-on or during a reset operation. The analysis of the boot-up time $T_b$ is exemplarily illustrated in FIG. 11. The communication latency is the time required to transact the test results to the test console. This is based on a baud-rate, that is, a rate at which the satellite navigation receiver outputs symbols of the navigation data to the test console. Once configured, the boot-up time $T_b$ remains constant for the navigation data transacted with the test console. The boot-up time of the satellite navigation receiver is, for example, about 250 milliseconds (ms). On generalizing the total time taken to power the satellite navigation receiver into operation, $T_b$ is considered as the time taken to boot the application software of the satellite navigation receiver.

Subsequent to booting, the satellite navigation receiver is configured to receive radio frequency navigation signals from satellites and associated satellite channels of a 32 global positioning system (GPS) and a 14 global navigation satellite system (GLONASS) for further processing. The satellite navigation receiver, for example, takes about 2 seconds to about 8 seconds for signal acquisition from the visible satellites. Generalizing this timing component, $T_a$ is the time taken to acquire coarse estimates of a code phase and a carrier Doppler frequency of the visible satellites. Subsequent to acquisition of the radio frequency navigation signals, each satellite channel in the satellite navigation receiver takes a finite amount of time, for example, about 1.2 seconds for bit-synchronization. Generalizing this timing component, $T_{bs}$ is the time taken for bit-synchronization.

The next activity on each of the bit-synchronized satellite channels is collection of the ephemeris data. The collection of the ephemeris data takes, for example, about 18 seconds to about 30 seconds for a GPS based system, which is the time taken to collect the first sub-frame and the second sub-frame. The collection of the ephemeris data takes, for example, about 8 seconds to about 30 seconds for GLONASS satellite channels. This timing component may be represented as "$T_{eph}$", that is, the collection time of the ephemeris data also referred to as ephemeris data collection time. The satellite navigation receiver computes the user position from the extracted navigation data and characteristic measurements of the satellite such as pseudorange measurements, delta-range measurements, range-rate measurements, etc. The computation of the position of the user takes, for example, about 1 second and the timing component is referred to as "$T_{pos}$".

The following equation is created for representing the TTFF for a line of sight (LOS) satellite navigation receiver:

$$TTFF = T_b + T_a + T_{bs} + T_{eph} + T_{pos}$$

Based on multiple iterations of power on-off of the satellite navigation receiver, the time taken by each of the above parameters are grouped and analyzed.

Subsequently, for each tracked satellite channel, the satellite navigation receiver collects the almanac data. However, the almanac data collection takes, for example, about 12.5 minutes referenced from the instant of a first tracked satellite channel in case of the GPS and, for example, about 2.5 minutes in case of the GLONASS. This timing component is represented as $T_{alm}$, which is the time required to collect the almanac data. Typically, a single frequency global navigation satellite system (GNSS) receiver depends on ionosphere correction terms, which are transmitted as a part of the almanac data. The satellite navigation receiver applies the ionosphere correction to the characteristic measurements, for example, pseudorange measurements to provide a relatively accurate solution. Considering $T_{posc}$ to be the time taken by the satellite navigation receiver to provide a position solution, that is, a "fix" after correcting ionosphere errors based on the ionosphere error measurements and accounting for an ionosphere delay received as part of the almanac data, the overall timing equation of the satellite navigation receiver for the timing component $T_{posc}$ is:

$$T_{posc} = T_b + T_a + T_{bs} + T_{eph} + T_{alm}$$

The timing component that determines the TTFF for a user in open-sky conditions is $T_{eph}$. This component is completely dependent on the design of the navigation data structure for a particular constellation and is independent of the satellite navigation receiver. The navigation data structure generated by the signal generation system disclosed herein improves the TTFF performance of the satellite navigation receiver, for example, by reducing the $T_{eph}$ parameter. The method and system disclosed herein further reduces $T_{alm}$, thereby enabling the satellite navigation receiver to provide a relatively faster ionosphere correction solution.

Figure 2:
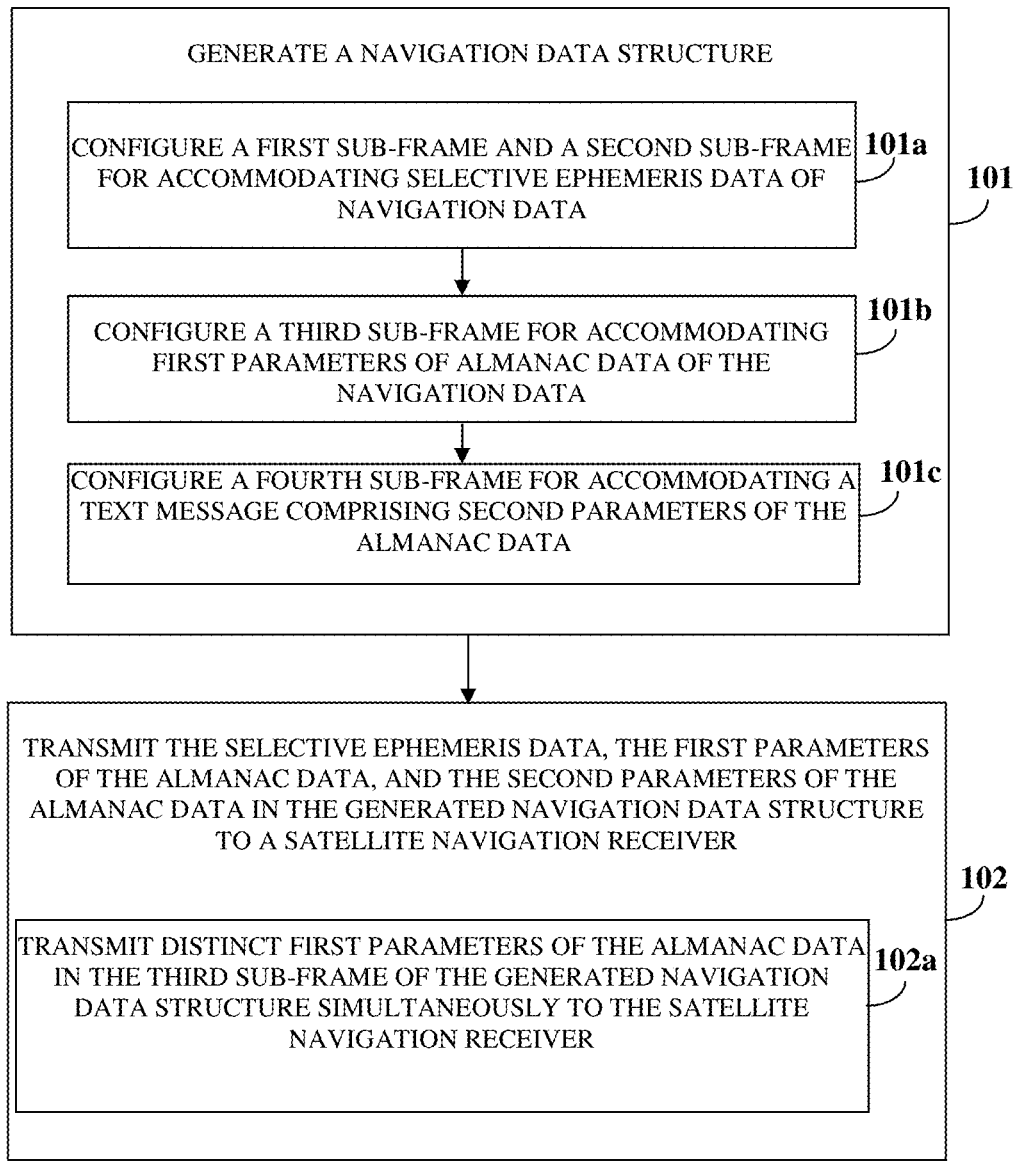
FIG. 2 illustrates a method for transmitting almanac data to a satellite navigation receiver for reducing time required for collecting almanac data by the satellite navigation receiver.

FIG. 2 illustrates a method for transmitting almanac data to a satellite navigation receiver for reducing time required for collecting almanac data by the satellite navigation receiver. The signal generation system generates 101a navigation data structure by configuring 101a a first sub-frame and a second sub-frame, by configuring 101b a third sub-frame, and by configuring 101c a fourth sub-frame as disclosed in the detailed description of FIG. 1. The signal generation system transmits 102 the selective ephemeris data, the first parameters of the almanac data, and the second parameters of the almanac data in the generated navigation data structure to the satellite navigation receiver. In an embodiment, each of multiple satellites of a constellation simultaneously transmits 102a distinct first parameters of the almanac data in the third sub-frame of the generated navigation data structure to the satellite navigation receiver, thereby allowing the satellite navigation receiver to receive collective almanac data in reduced time, which, for example, reduces the time required for applying ionosphere correction to a geometric range. This further reduces time required to obtain a user position defined by the time to first fix in the satellite navigation receiver. This simultaneous transmission of distinct first parameters of the almanac data in the third sub-frame of the generated navigation data structure to the satellite navigation receiver avoids repeated transmission of the same first parameters of the almanac data by each of the satellites as exemplarily illustrated in FIGS. 8-9.

The signal generation system selects a distinct almanac page of the almanac data for transmission by each of the satellites at each time instant. The selected distinct almanac page of the almanac data of each of the satellites constitutes the collective almanac data for the constellation of satellites. The signal generation system transmits the selected distinct almanac page of each satellite to the satellite navigation receiver via a separate satellite channel associated with each of the satellites.

Typically, the TTFF for a single frequency global navigation satellite system (GNSS) in cold start mode with line of sight (LOS) satellite signals is, for example, about 30 seconds (s). The method disclosed herein allows a single frequency satellite navigation receiver to collect almanac data, for example, in about 24 seconds. This reduction in collection time of the almanac data by the single frequency satellite navigation receiver provides, for example, about three and a half times improvement over a conventional GNSS system. Furthermore, this allows the single frequency satellite navigation receiver to estimate the ionosphere delay within 24 seconds and apply the estimated ionosphere delay in the computation of the position of the satellite.

Figure 3:
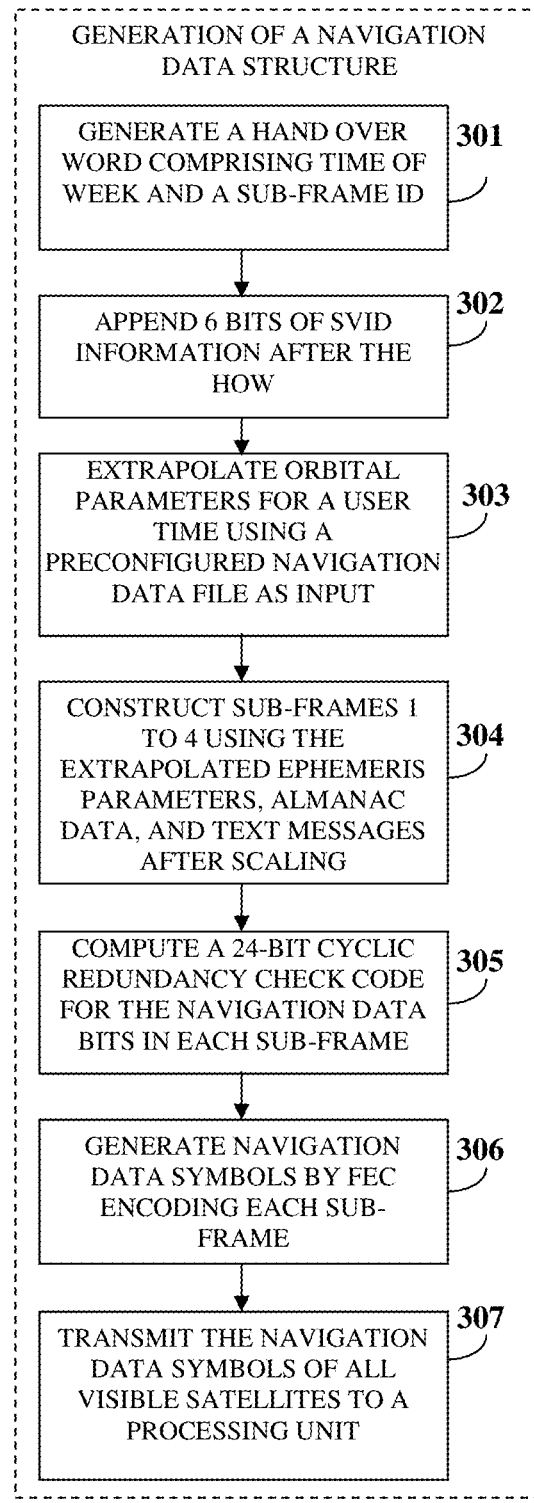
FIG. 3 exemplarily illustrates a flow diagram comprising the steps for generating a navigation data structure.

FIG. 3 exemplarily illustrates a flow diagram comprising the steps for generating a navigation data structure. The signal generation system disclosed herein generates 301a hand over word (HOW) comprising information on time of week (TOW) and a sub-frame identifier (ID). The signal generation system appends 302 six bits of a space vehicle identification (SVID) number after the HOW word. The signal generation system extrapolates 303 orbital parameters for a given user time using a preconfigured navigation data file, for example, an almanac file as input. The signal generation system constructs 304 sub-frames 1 to 4 using the extrapolated ephemeris parameters, almanac data, and text messages after scaling, for reducing the number of effective bits to be transmitted. The scaling is performed for enabling optimal transmission of the navigation data since standard definitions of the data fields within each sub-frame take several bytes of data to represent the correct information. The signal generation system computes 305 the 24 bit cyclic redundancy check (CRC) code for the navigation data bits in each sub-frame. The signal generation system generates 306 symbols of the navigation data, herein referred to as "navigation data symbols", for example, by applying forward error correction (FEC) encoding to each sub-frame. The signal generation system transmits 307 the navigation data symbols of all the visible satellites to a processing unit for generating a radio frequency navigation signal.

Figure 4:
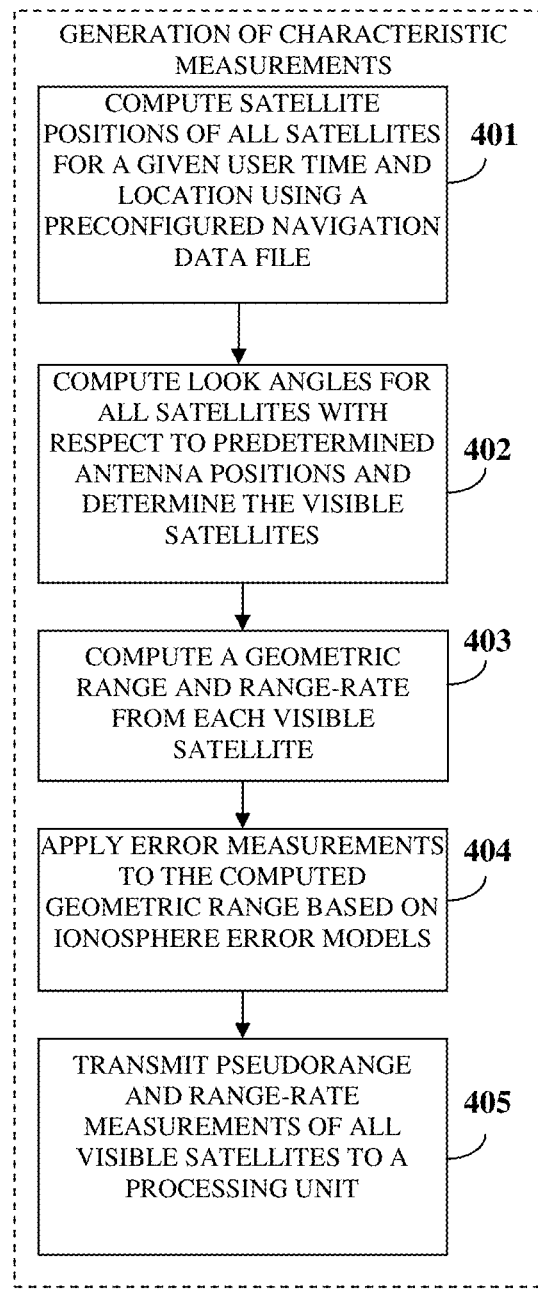
FIG. 4 exemplarily illustrates a flow diagram comprising the steps for generating characteristic measurements of each satellite of a constellation.

FIG. 4 exemplarily illustrates a flow diagram comprising the steps for generating characteristic measurements of each satellite of a constellation. The characteristic measurements comprise, for example, pseudorange measurements, delta-range measurements, etc. The signal generation system disclosed herein computes 401 satellite positions of all satellites of the constellation for a given user time and location using a preconfigured navigation data file, for example, a preconfigured almanac file as input. The signal generation system computes 402 look angles, that is, the elevation and azimuth angles for all the satellites with respect to predetermined antenna positions from the satellite navigation receiver located at the user's position, and determines the visible satellites. The signal generation system computes 403 a geometric range, that is, a line of sight distance between a satellite and the satellite navigation receiver, and a range-rate, that is, the rate of change of the range of the satellite relative to the satellite navigation receiver, for each visible satellite. Further, the signal generation system computes a pseudorange, that is, a perceived distance of the satellite from the satellite navigation receiver inclusive of error measurements, and a delta range, that is, the change in the range between the satellite relative to the satellite navigation receiver. The signal generation system applies 404 error measurements to the computed geometric range based on ionosphere error models. The signal generation system, for example, applies the ionosphere error measurements to simulate the ionosphere error characteristics. The signal generation system transmits 405 the pseudorange and range-rate measurements of all the visible satellites to the processing unit for further processing.

FIG. 5 exemplarily illustrates a table that specifies parameters and specifications for generating the navigation data structure. The table specifies an encoding scheme, spreading code specifications, and carrier specifications for generating the navigation data structure. The encoding scheme comprises, for example, a code rate, a constraint length, a generator polynomial, a data rate, a synchronization word, etc. The spreading code specifications used for performing a spreading operation on the navigation data comprise, for example, a code length, a chipping rate, etc. The carrier specifications comprise, for example, a carrier frequency, a bandwidth, modulation scheme, and a power level.

Figure 6:
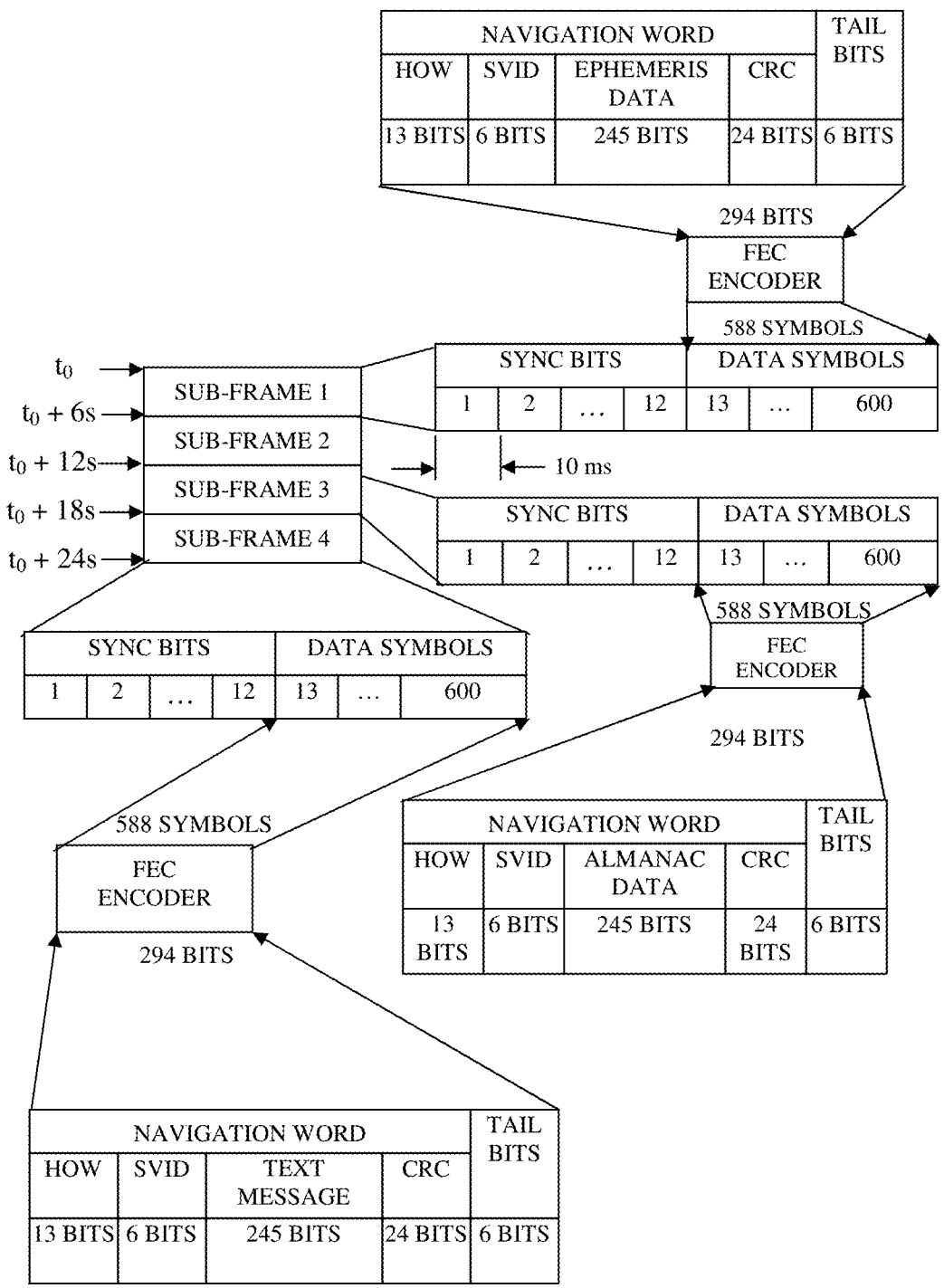
FIG. 6 exemplarily illustrates the navigation data structure generated by a signal generation system.

FIG. 6 exemplarily illustrates the navigation data structure generated by the signal generation system. Each navigation data structure comprises four sub-frames, for example, sub-frame 1, sub-frame 2, sub-frame 3, and sub-frame 4. Each sub-frame comprises a synchronization word with 12 synchronization bits, and 588 data symbols. The bit duration of each synchronization bit is 10 milliseconds (ms). As exemplarily illustrated in FIG. 6, since the 588 data symbols are generated after applying a half rate forward error correction (FEC) encoding to the data bits, the total number of data bits is 294. The data bits comprise a navigation word of length 288 bits and 6 tail bits. The tail bits serve as integrity bits and enable the performance of FEC decoding in the satellite navigation receiver. The tail bits ensure that at the end of each sub-frame the signal generation system is brought back or reset to an initial default state. In an example, the addition of the tail bits is performed using a shift register. At the end of each sub-frame, six zeros are loaded to the shift register due to the tail bits allowing a reset of the shift register.

The navigation word of sub-frame 1 and sub-frame 2 comprises a handover word (HOW) of length 13 bits that specifies the time of week (TOW) and a sub-frame identifier, a space vehicle identification number (SVID) of length 6 bits for identifying a satellite, 245 data bits of the particular sub-frame, for example, 2×245 ephemeris data bits in sub-frames 1 and 2 put together, and 24 cyclic redundancy code (CRC) check bits. The navigation word of sub-frame 3 comprises a handover word (HOW) of length 13 bits that specifies the time of week (TOW) and a sub-frame identifier, a space vehicle identification number (SVID) of length 6 bits for identifying a satellite, 245 almanac data bits, and 24 cyclic redundancy code (CRC) check bits. The navigation word of sub-frame 4 comprises a handover word (HOW) of length 13 bits that specifies the time of week (TOW) and a sub-frame identifier, a space vehicle identification number (SVID) of length 6 bits for identifying a satellite, 245 text message bits, and 24 cyclic redundancy code (CRC) check bits.

FIGS. 7A-7D exemplarily illustrate tables describing data fields of the generated navigation data structure. The individual data fields of the navigation data structure for each of sub-frame 1, sub-frame 2, sub-frame 3, and sub-frame 4 are exemplarily illustrated in FIGS. 7A-7D. Each of the sub-frames comprises a pseudorandom number (PRN) code that identifies the satellite to which the navigation data is applicable. For example, sub-frames 1-2 are filled with the PRN code of the transmitting satellite, since the ephemeris data is relevant only to the satellite transmitting a navigation signal containing the navigation data structure; sub-frames 3-4 are filled with the PRN code of the satellite whose almanac data appears in the navigation data structure, since each satellite also transmits almanac data for every other satellite in the associated satellite constellation.

Figure 8:
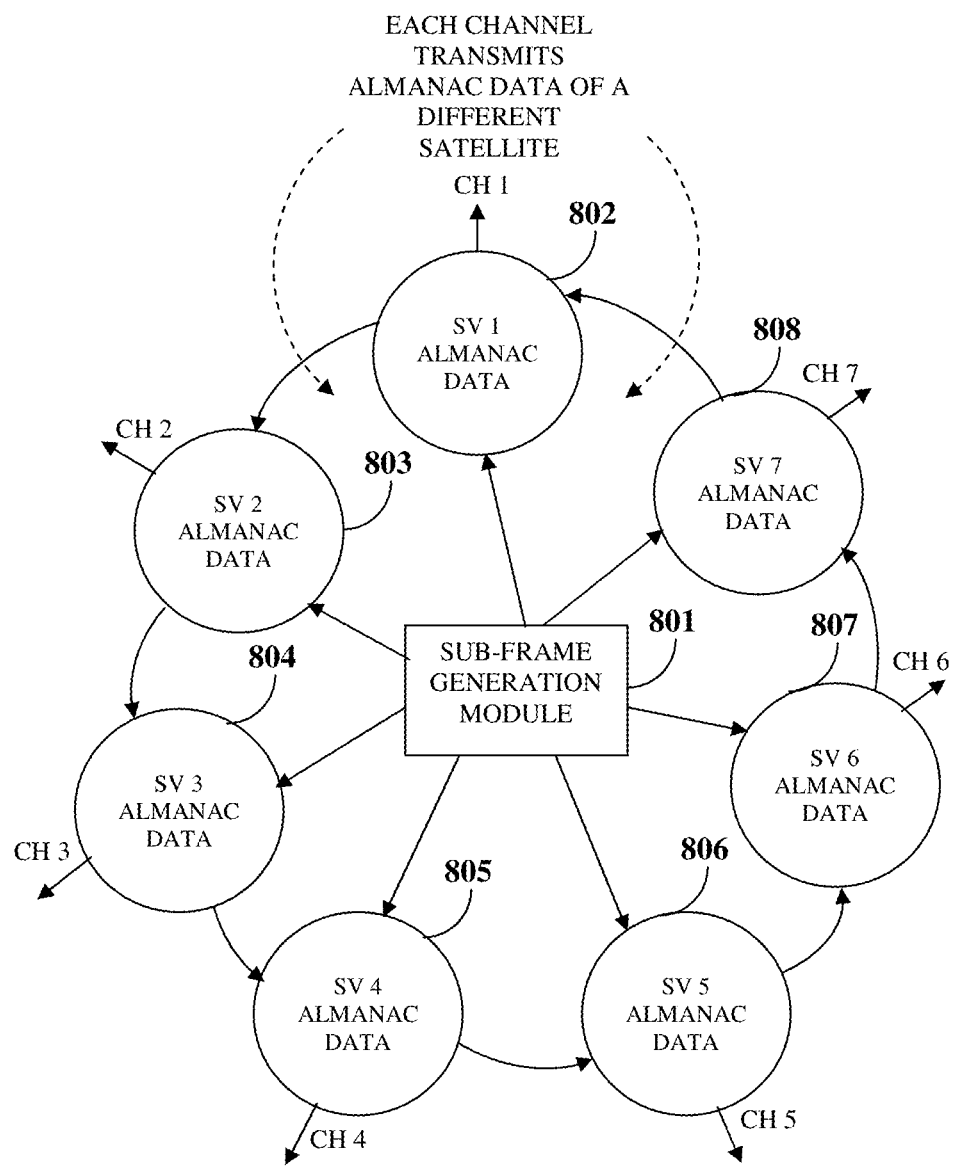
FIG. 8 exemplarily illustrates a block diagram showing simultaneous transmission of distinct almanac data to a satellite navigation receiver by each satellite of a seven-satellite constellation.

FIG. 8 exemplarily illustrates a block diagram showing simultaneous transmission of distinct almanac data to a satellite navigation receiver by each satellite of a seven-satellite constellation. As exemplarily illustrated in FIG. 8, the seven-satellite constellation comprises seven satellites 802, 803, 804, 805, 806, 807, and 808. A sub-frame generation module 801 of the signal generation system disclosed herein generates a third sub-frame comprising the first parameters of the almanac data. The third sub-frame transmitted by each satellite is configured to accommodate distinct first parameters of the almanac data that ensure that each of the satellites 802, 803, 804, 805, 806, 807, and 808 is transmitting different almanac data.

Each satellite is associated with a separate satellite channel defined by a separate carrier frequency and a pseudorandom number (PRN). Each satellite channel transmits almanac data of a different satellite to the satellite navigation receiver. The satellite navigation receiver collects the almanac data from all the visible satellites 802, 803, 804, 805, 806, 807, and 808 simultaneously. Since the complete almanac data is staggered over different transmitting satellites 802, 803, 804, 805, 806, 807, and 808 at any given time, the satellite navigation receiver collects the third sub-frame from all the satellites 802, 803, 804, 805, 806, 807, and 808 and segregates the sub-frames based on the pseudorandom number (PRN) in each set of navigation data. The satellite navigation receiver obtains the complete almanac data for the constellation at each time instant, thereby reducing the time required to collect almanac data of all satellites 802, 803, 804, 805, 806, 807, and 808. In an example, considering the Indian regional navigational satellite system (IRNSS) which is a regional navigational satellite system, the almanac transmission time "$T_{alm}$" is reduced to 24 seconds.

FIG. 9 exemplarily illustrates a table representing simultaneous transmission of distinct almanac data to a satellite navigation receiver at periodic time intervals by each satellite of a seven-satellite constellation. The table exemplarily illustrates the transmission of distinct almanac data, represented as almanac pages by each satellite 802, 803, 804, 805, 806, 807, and 808 of the seven-satellite constellation exemplarily illustrated in FIG. 8, for example, of the Indian regional navigational satellite system (IRNSS) at time intervals of 24 seconds, according to the method of transmission of the almanac data disclosed herein. As indicated in the table, the almanac pages transmitted by each of the satellite over respective satellite channels are distinct. For example, when satellite with a space vehicle identification (SVID) number SV1 transmits an almanac page 2 comprising almanac data for satellite 2 at time instant $t_0+24$, the satellite with SVID number SV2 transmits an almanac page 3, the satellite with SVID number SV3 transmits an almanac page 4, etc.

At a time instant $t_0+24$, the satellite navigation receiver can access all the almanac pages simultaneously and obtain the complete almanac data, that is, the satellite navigation receiver processes the almanac data from the seven satellite channels associated with the seven satellites 802, 803, 804, 805, 806, 807, and 808 exemplarily illustrated in FIG. 8, simultaneously. The almanac data can similarly be collected at time instants $t_0+48$, $t_0+72$, etc. The sequence of almanac pages is cyclically ordered and each satellite transmits almanac pages that are distinct, at time instants separated by intervals of 24 seconds, equivalent to the time taken to transmit the complete navigation data structure. Therefore, at each time instant, each satellite channel transmits different almanac data.

Figure 10:
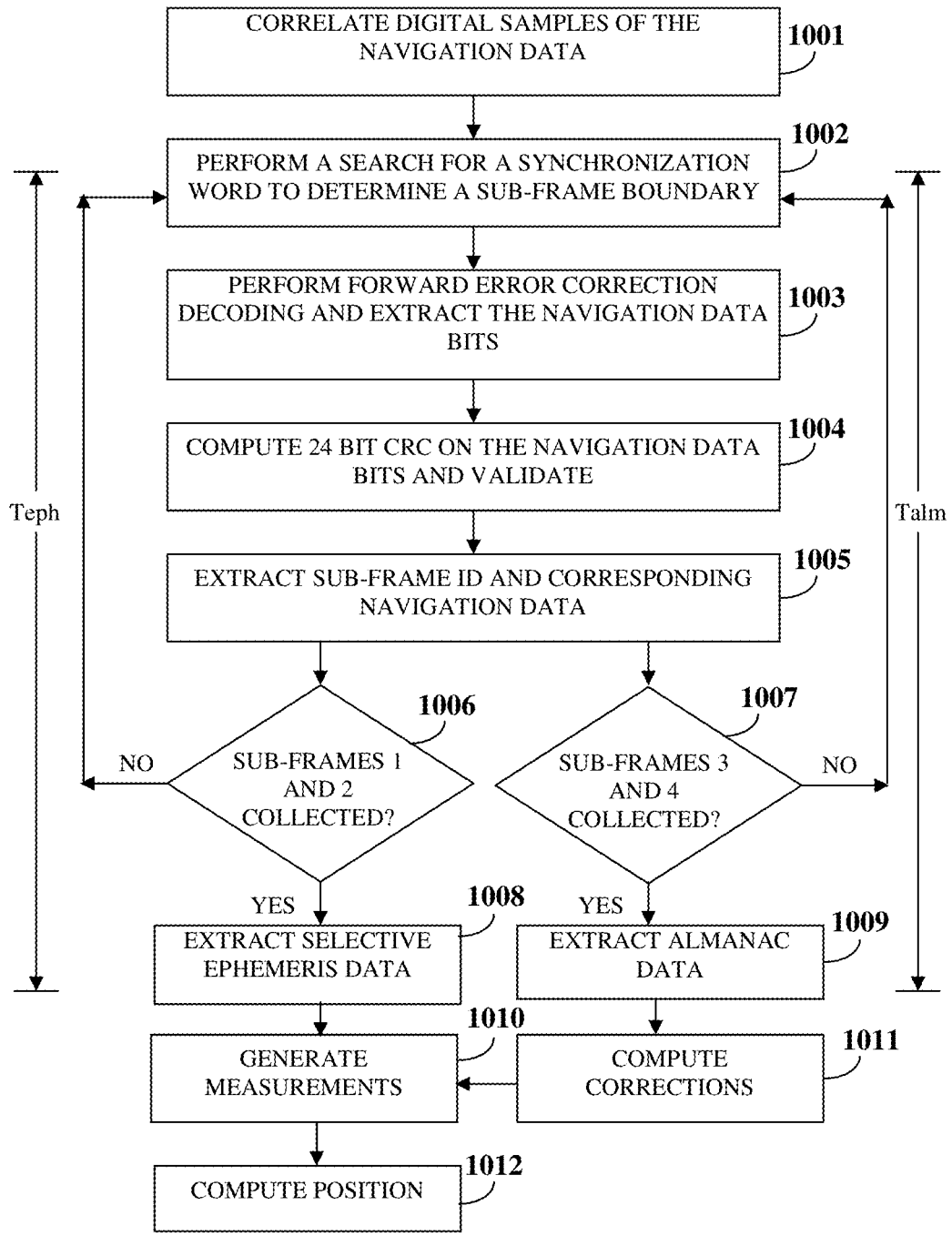
FIG. 10 exemplarily illustrates a flowchart comprising the steps for extracting navigation data from the generated navigation data structure contained in navigation signals received by the satellite navigation receiver.

FIG. 10 exemplarily illustrates a flowchart comprising the steps for extracting navigation data from the generated navigation data structure contained in navigation signals received by the satellite navigation receiver. The satellite navigation receiver receives, for example, radio frequency navigation signals from multiple satellites of a constellation. The radio frequency navigation signals comprise navigation data filled in the generated navigation data structure. The satellite navigation receiver performs an analog to digital conversion of the radio frequency navigation signal and obtains digital samples of the navigation data. The satellite navigation receiver correlates 1001 the digital samples of the navigation data with locally generated reference navigation data samples for aligning the pseudorandom ranging code and the carrier frequency of a satellite extracted from the received navigation signal with the expected pseudorandom ranging code and carrier frequency, for identifying a particular satellite and an associated satellite channel. The satellite navigation receiver then proceeds with the analysis of the correlated digital samples.

The satellite navigation receiver performs 1002 a search for a synchronization word in the correlated navigation data samples to determine a sub-frame boundary of the first sub-frame, second sub-frame, third sub-frame, and the fourth sub-frame in the navigation data structure. Since the synchronization word is expected once every 588 bits of data, the satellite navigation receiver compares the synchronization word with an expected reference synchronization word to find a match. After establishing the sub-frame synchronization, the satellite navigation receiver performs 1003 forward error correction (FEC) decoding and extracts the navigation data bits. The satellite navigation receiver decodes the 588 forward error correction (FEC) encoded symbols, for example, using the Viterbi algorithm to obtain 294 bits of data. The satellite navigation receiver computes 1004 the 24-bit cyclic redundancy check (CRC) on the decoded navigation data bits and validates the computed CRC with the CRC received from the navigation data bits. The satellite navigation receiver extracts 1005 the sub-frame identifier that identifies a specific sub-frame from the HOW, and the navigation data stored in the identified sub-frame.

The satellite navigation receiver checks 1006 whether the first sub-frame and the second sub-frame are collected at the satellite navigation receiver by using the sub-frame identifier extracted from the HOW. If the first sub-frame and the second sub-frame are collected correctly, the satellite navigation receiver groups the ephemeris data defined in the first sub-frame and the second sub-frame together. The satellite navigation receiver then extracts 1008 the selective ephemeris data from the first sub-frame and the second sub-frame. If the first sub-frames and the second sub-frame are not collected, the satellite navigation receiver returns to the step of determining the sub-frame boundary by searching for the synchronization word. The satellite navigation receiver checks 1007 whether the third sub-frame and the fourth sub-frame are collected at the satellite navigation receiver. If the third sub-frame and the fourth sub-frame are collected correctly, the satellite navigation receiver groups the almanac data in the third sub-frame and the text message data in the fourth sub-frame together and extracts 1009 the almanac data from the third sub-frame and the fourth sub-frame. The satellite navigation receiver computes 1011 corrections in the estimation of the position of the satellite, for example, based on the ionosphere corrections received in the almanac data. If the third sub-frame and the fourth sub-frame have not been collected correctly, the satellite navigation receiver returns to the step of determining the sub-frame boundary by searching for the synchronization word.

The satellite navigation receiver generates 1010 measurements, for example, estimates of the position of the satellite, from the ephemeris data. The satellite navigation receiver computes the satellite state vectors, that is, the position coordinates of the satellite corresponding to the time of measurement. The satellite navigation receiver computes 1012 the position of the user based on the measurements and the satellite state vectors. The satellite navigation receiver, for example, applies a triangulation algorithm to obtain the geographical position of the user from the satellite vectors.

Figure 11:
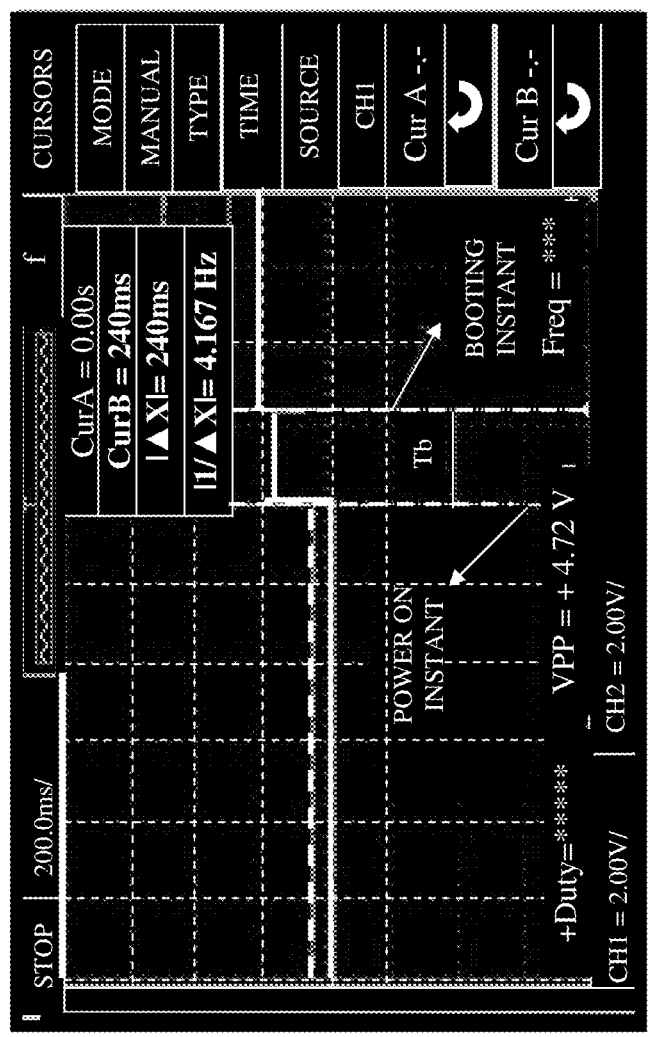
FIG. 11 exemplarily illustrates a screenshot of a graphical user interface of the satellite navigation receiver displaying analysis of boot-up time of the satellite navigation receiver.

FIG. 11 exemplarily illustrates a screenshot of a graphical user interface of the satellite navigation receiver displaying analysis of boot-up time of the satellite navigation receiver. The boot-up time $T_b$ is calculated from the power-on instant as disclosed in the detailed description of FIG. 1. The operating conditions comprising the operating voltage, frequency, etc., at the instant when the satellite navigation receiver is powered on, is indicated on the graphical user interface.

Figure 12:
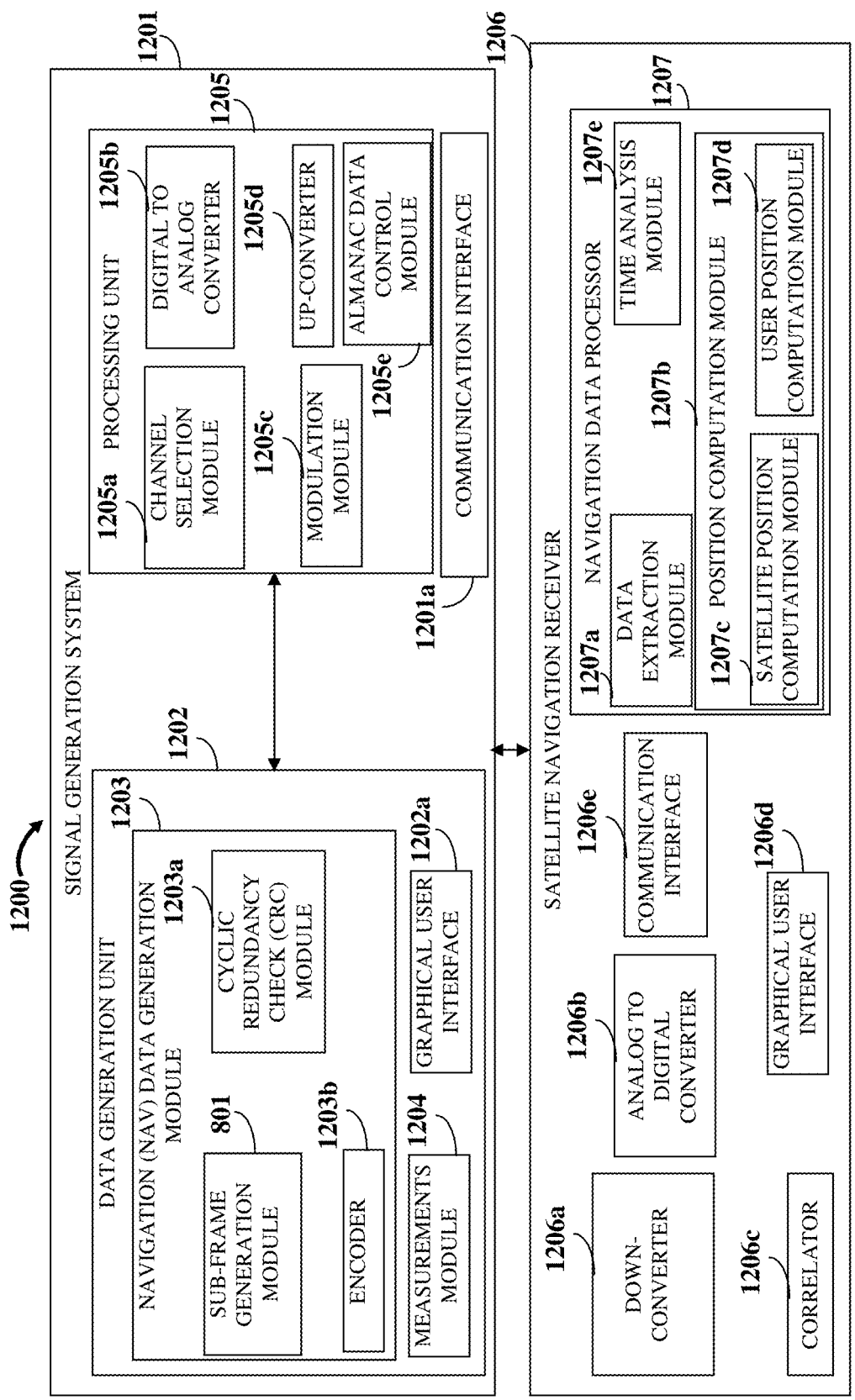
FIG. 12 exemplarily illustrates a system for transmitting navigation data to a satellite navigation receiver for reducing time to first fix in the satellite navigation receiver.

FIG. 12 exemplarily illustrates a system 1200 for transmitting navigation data to a satellite navigation receiver 1206 for reducing time to first fix in the satellite navigation receiver 1206. The system 1200 disclosed herein comprises a signal generation system 1201 that generates a navigation signal, for example, a radio frequency navigation signal that enables reduction of time to first fix in the satellite navigation receiver 1206. The system 1200 further comprises a single frequency satellite navigation receiver 1206, herein referred to as a "satellite navigation receiver", that receives the generated radio frequency navigation signal in reduced time, extracts the navigation data from the received radio frequency navigation signal, and processes the extracted navigation data in reduced time, thereby reducing the time to first fix in the satellite navigation receiver 1206. The signal generation system 1201 and the satellite navigation receiver 1206 communicate via communication interfaces 1201a and 1206e respectively. The communication interfaces 1206e and 1201a are, for example, ports that enable coupling of the satellite navigation receiver 1206 to the signal generation system 1201, for example, via a wired interface such as a radio frequency (RF) cable.

The signal generation system 1201 comprises a data generation unit 1202 and a processing unit 1205. The data generation unit 1202 generates navigation data and measurements. The data generation unit 1202 of the signal generation system 1201 comprises a measurements module 1204 and a navigation data generation module 1203. The measurements module 1204 generates characteristic measurements comprising, for example, pseudorange measurements and delta-range measurements of each satellite of a constellation. In an embodiment, the data generation unit 1202 further comprises a graphical user interface 1202a that profiles navigation data measurements, health measurements of a satellite, etc.

The navigation data generation module 1203 generates a navigation data structure as exemplarily illustrated in FIG. 6, using the generated characteristic measurements. The navigation data structure comprises a first sub-frame and a second sub-frame configured for accommodating selective ephemeris data of the navigation data, a third sub-frame configured for accommodating first parameters of almanac data of the navigation data, and a fourth sub-frame configured for accommodating a text message comprising second parameters of the almanac data as disclosed in the detailed description of FIG. 1 and FIG. 6. The configuration of the first sub-frame and the second sub-frame reduces the time for collecting the selective ephemeris data by the satellite navigation receiver 1206. The configuration of the third sub-frame and the fourth sub-frame reduces the time for collecting the first parameters and the second parameters of the almanac data respectively.

The navigation data generation module 1203 comprises a sub-frame generation module 801, a cyclic redundancy check (CRC) module 1203a, and an encoder 1203b. The sub-frame generation module 801 generates the first sub-frame, the second sub-frame, the third sub-frame and the fourth sub-frame using the selective ephemeris data, the almanac data, and the text message extrapolated from preconfigured navigation data files associated with each satellite. The preconfigured navigation data files comprise, for example, almanac files that store the coarse orbital parameters and status information of the satellite, ephemeris files that store orbital and clock correction parameters for each satellite, etc. The cyclic redundancy check module 1203a computes cyclic redundancy check bits for each of the first sub-frame, the second sub-frame, the third sub-frame, and the fourth sub-frame, for enabling validation of the integrity of the navigation data by the satellite navigation receiver 1206. The encoder 1203b applies a forward error correcting code to the navigation data for encoding each of the first sub-frame, the second sub-frame, the third sub-frame, and the fourth sub-frame, and generating symbols of the navigation data.

The processing unit 1205 of the signal generation system 1201 processes the generated navigation data structure comprising the selective ephemeris data, the first parameters of the almanac data, and the second parameters of the almanac data to generate, for example, a radio frequency (RF) navigation signal. The processing unit 1205 transmits the generated navigation signal to the satellite navigation receiver 1206 via the communication interface 1201a in reduced time, thereby reducing the time to first fix in the satellite navigation receiver 1206.

The processing unit 1205 comprises a channel selection module 1205a, a digital to analog converter 1205b, a modulation module 1205c, an up-converter 1205d, and an almanac data control module 1205e. The channel selection module 1205a selects a satellite channel that is associated with a satellite. The modulation module 1205c generates a carrier frequency and a ranging code, for example, a pseudorandom number (PRN) code for a satellite channel associated with a satellite, over which the generated navigation signal is to be transmitted. The ranging code is an identifier that is transmitted from the satellite to the satellite navigation receiver 1206 using which the satellite navigation receiver 1206 can determine the amount of transmission time that a navigation signal takes to reach the satellite navigation receiver 1206. The ranging code can be used to determine the approximate distance between the satellite and the satellite navigation receiver 1206. The modulation module 1205c performs an exclusive OR (EXOR) operation between the bits of the navigation data structure and the ranging code received from the satellite.

The modulation module 1205c modulates the navigation data in the generated navigation data structure received from the data generation unit 1202, with the generated carrier frequency and the generated ranging code for generating an intermediate frequency (IF) signal. In an example, the modulation module 1205c modulates the EXORed navigation data onto the generated carrier frequency to generate a composite modulated IF signal. The modulation module 1205c uses a digital modulation technique, for example, a binary phase shift keying (BPSK) modulation technique and generates digital samples. The digital to analog converter 1205b converts the digital samples to an intermediate frequency (IF) signal. The up-converter 1205d translates the IF signal to generate the radio frequency navigation signal.

The processing unit 1205 of the signal generation system 1201 transmits the radio frequency navigation signal to the satellite navigation receiver 1206 via the communication interface 1201a, for example, using a radio frequency (RF) cable, thereby allowing the satellite navigation receiver 1206 to process the radio frequency navigation signal in reduced time. This reduces the time to first fix in the satellite navigation receiver 1206.

In an embodiment, the almanac data control module 1205e of the processing unit 1205 simultaneously transmits distinct first parameters of the almanac data in the third sub-frame of the generated navigation data structure of each satellite of a constellation via the communication interface 1201a to the satellite navigation receiver 1206. This allows the satellite navigation receiver 1206 to receive collective almanac data for the constellation in reduced time, thereby further reducing the time to first fix in the satellite navigation receiver 1206.

The almanac data control module 1205e of the processing unit 1205 selects a distinct almanac page of the almanac data for each satellite of the constellation for transmission to the satellite navigation receiver 1206. The selected distinct almanac page of the almanac data of each of the satellites constitutes the collective almanac data for the constellation of satellites. The almanac data control module 1205e transmits each of the selected distinct almanac pages to the satellite navigation receiver 1206 via the communication interface 1201a for each of the satellites. The communication interface 1206e of the satellite navigation receiver 1206 simultaneously receives the distinct first parameters of the almanac data in the third sub-frame of the generated navigation data structure from each of the satellites, thereby allowing the satellite navigation receiver 1206 to receive the collective almanac data in reduced time, thereby further reducing the time to first fix in the satellite navigation receiver 1206.

The satellite navigation receiver 1206 comprises a radio frequency down-converter 1206a, an analog to digital converter (ADC) 1206b, a correlator 1206c, and a navigation data processor 1207. The radio frequency down-converter 1206a converts the received radio frequency navigation signal to an intermediate frequency (IF) signal. The analog to digital converter 1206b converts the intermediate frequency signal to digital samples. The correlator 1206c correlates the digital samples of the navigation signal with locally generated signals, for example, reference digital samples. This enables data bit demodulation and further decoding of the navigation data structure.

The navigation data processor 1207 decodes the correlated digital samples for extracting the navigation data from the generated navigation data structure contained in the navigation signal in reduced time. The navigation data processor 1207 processes the extracted navigation data for computing the position of each satellite. The navigation data processor 1207 determines a geographical position of a user based on the processed navigation data in reduced time.

The navigation data processor 1207 comprises a data extraction module 1207a and a position computation module 1207b. The data extraction module 1207a extracts navigation data from the generated navigation data structure contained in the navigation signal in reduced time. The data extraction module 1207a decodes the correlated digital samples received from the correlator 1206c to extract the navigation data from the navigation data structure. The position computation module 1207b processes the extracted navigation data for computing, for example, a geometric position of each satellite and estimating a geographical position of a user based on the processed navigation data in reduced time. The position computation module 1207b comprises a satellite position computation module 1207c and a user position computation module 1207d. The satellite position computation module 1207c processes the extracted navigation data for computing the position of the satellite based on the processed navigation data. The satellite position computation module 1207c computes the geometric range and range-rate of each satellite. The user position computation module 1207d estimates a geographical position of a user, that is, latitude, longitude, altitude, etc., of the user, for example, by applying a standard global positioning system (GPS) based triangulation algorithm. In an embodiment, the satellite navigation receiver 1206 further comprises a graphical user interface (GUI) 1206d as disclosed in the detailed description of FIG. 16.

In an embodiment, the navigation data processor 1207 further comprises a time analysis module 1207e that analyzes timing components that constitute the time to first fix, and identifies timing delays at the satellite navigation receiver 1206. The timing components comprise a time for boot-up of the satellite navigation receiver 1206, a time for acquiring coarse estimates of a code phase and a carrier Doppler frequency of visible satellites of a constellation over satellite channels corresponding to the visible satellites, a time for performing bit synchronization of the satellite channels corresponding to the visible satellites, a time for extracting the navigation data from the generated navigation data structure contained in the navigation signals received from the visible satellites by the satellite navigation receiver 1206, and a time for computing a geographical position of a user based on the extracted navigation data.

Figure 13:
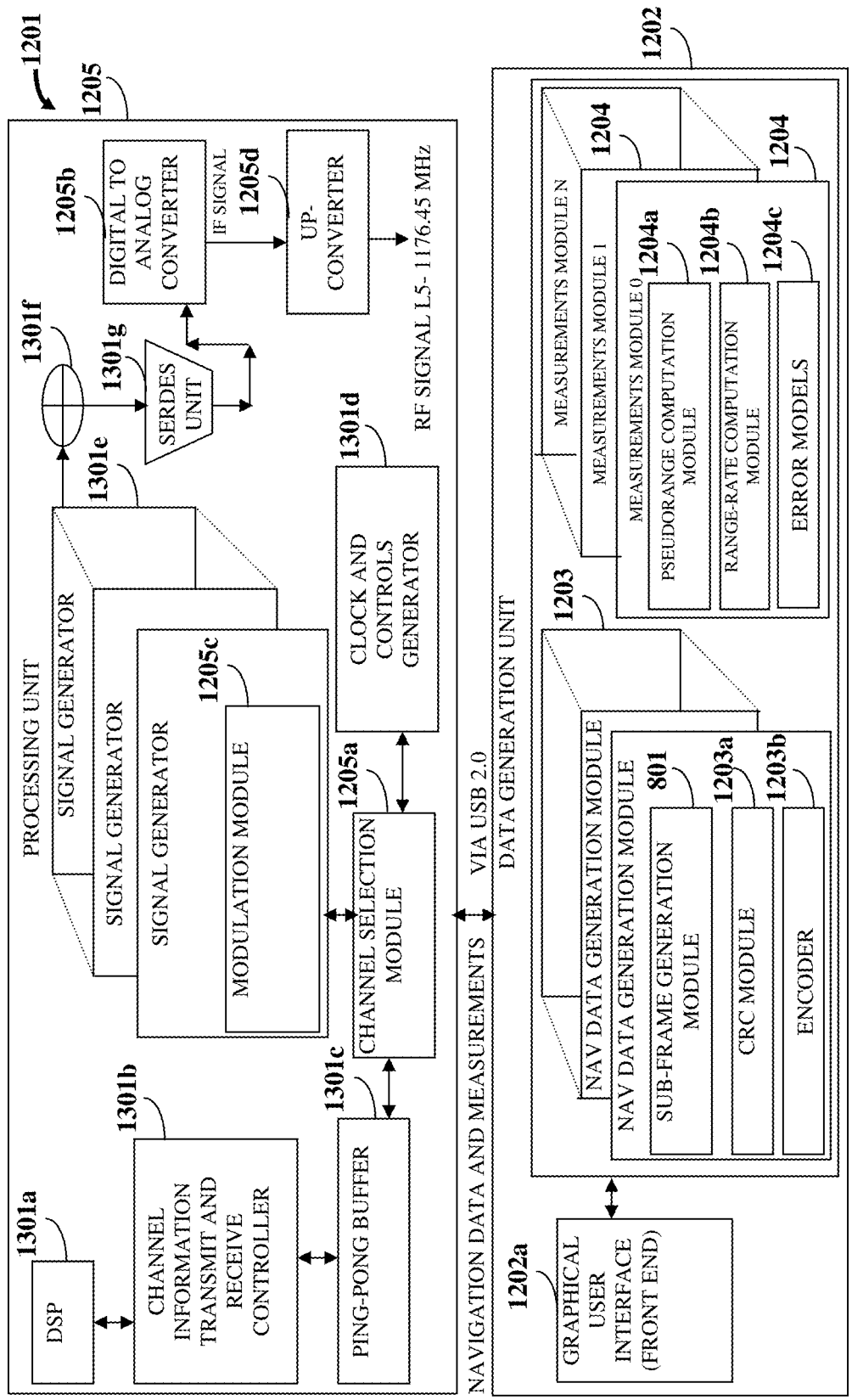
FIG. 13 exemplarily illustrates a high level block diagram of the signal generation system.

FIG. 13 exemplarily illustrates a high level block diagram of the signal generation system 1201. The signal generation system 1201 is configured as a simulator for generating the navigation data. The signal generation system 1201 disclosed herein is a seven-channel signal generation system. The signal generation system 1201 is implemented on a console, for example, a laptop or other computing device. The signal generation system 1201 comprises the data generation unit 1202 that generates the navigation data bits and navigation measurements for visible satellites on the associated satellite channels, and the processing unit 1205 that generates a radio frequency navigation signal for transmission over a communication interface 1201a, for example, via a radio frequency (RF) cable to the satellite navigation receiver 1206 as disclosed in the detailed description of FIG. 12. The signal generation system 1201 employs a front-end graphical user interface (GUI) 1202a that enables simulation of the navigation data parameters. The data generation unit 1202 is, for example, housed in a dynamic link library (DLL).

The signal generation system 1201 disclosed herein initiates a real-time handshake between the data generation unit 1202 and the processing unit 1205. The basic parameters required for initiating generation of the radio frequency (RF) navigation signal are, for example, almanac data, user position and time, etc. The navigation data generation module 1203 of the data generation unit 1202 generates the navigation data bits and the measurements module 1204 generates the navigation measurements, for example, pseudorange measurements, delta-range measurements, error measurements, etc., for visible satellites over respective satellite channels. The navigation data bits comprise, for example, the individual parameters of the ephemeris data for the first two sub-frames, the almanac parameters for the third sub-frame, the coordinated universal time coordinates (UTC) parameters for the fourth sub-frame, etc. Further, the navigation data bits comprise the handover word (HOW) that specifies the time instant at which the first bit of the next sub-frame is to be transmitted and identifies a specific sub-frame within a complete navigation data structure, and a satellite vehicle identifier (SVID) that is a pseudorandom number that uniquely identifies a satellite. The measurements module 1204 comprises a pseudorange computation module 1204a, a range-rate computation module 1204b, and error models 1204c. The pseudorange computation module 1204a performs the pseudorange measurements. The range-rate computation module

1204b computes the range-rate with reference to the satellite. The error models 1204c, for example, ionosphere error models, enable corrections to the measurements based on the ionosphere delays.

The data generation unit 1202 inputs the navigation data bits to the cyclic redundancy check (CRC) module 1203a. The cyclic redundancy check module 1203a computes cyclic redundancy check bits for the navigation data bits. The encoder 1203b encodes the navigation data bits by applying forward error correction (FEC) encoding using an encoding algorithm, for example, the Viterbi code for generating symbols of the navigation data. The sub-frame generation module 801 generates each of the navigation data sub-frames, that is, the first sub-frame, the second sub-frame, the third sub-frame and the fourth sub-frame of the navigation data structure exemplarily illustrated in FIG. 6, by appending a synchronization word comprising synchronization bits that enable identification of the sub-frame boundary of the navigation data structure, to the encoded symbols of the navigation data in each sub-frame. The specifications for performing FEC encoding, the generator polynomial for generating the CRC check bits, the synchronization word, etc., are exemplarily illustrated and disclosed in the detailed description of FIG. 5. The data generation unit 1202 collects the individual sub-frames together, generates a navigation data structure, and transmits the navigation data structure to the processing unit 1205. To generate the necessary interface data, the data generation unit 1202 communicates the navigation data structure to the processing unit 1205 at a high data rate, for example, at a rate of about 115 kilobits per second (Kbps), for example, over a universal serial bus (USB) interface.

The processing unit 1205 comprises a field programmable gate array (FPGA) system (not shown) and a digital signal processor (DSP) 1301a. The DSP 1301a receives the navigation data and the navigation measurements from the processing unit 1205 via a serial port (SPORT) peripheral, and stores the received navigation data structure and the navigation measurements in an internal buffer of the DSP 1301a. In order to ensure that there is no loss of the navigation data at the time of performing a time critical operation, the DSP 1301a has a "ping-pong" arrangement of storing the incoming data using a ping-pong buffer 1301c. The ping-pong buffer 1301c enables memory management for real-time processing of navigation data. The ping-pong buffer 1301c stores the program parameters, information on the satellite channels, results, for example, status of transmission of the navigation data on the satellite channels, the critical navigation data and navigation measurements, etc.

The FPGA translates the characteristic measurements to effective spreading code and Doppler measurements using a specific pseudorandom code and uses numeric controlled oscillators (NCOs) for generating the Doppler frequency and code phase measurements. The clock and controls generator 1301d generates timing references for transmission of a radio frequency navigation signal on a specific satellite channel, to the satellite navigation receiver 1206 exemplarily illustrated in FIG. 12 and FIG. 14. The channel selection module 1205a selects the satellite channel associated with a satellite over which the navigation data needs to be transmitted to the satellite navigation receiver 1206. The channel information transmit and receive controller 1301b extracts the satellite channel information, for example, the frequency of operation of the satellite channel, etc., and communicates the channel information to the DSP 1301a.

The DSP 1301a receives the channel information from the channel information transmit and receive controller 1301b and processes the channel information. In order to generate the IF signal for each satellite channel, the DSP 1301a maintains channel parameters, for example, the carrier frequency, the ranging code, for example, a pseudorandom number (PRN) code corresponding to the satellite channel, etc., for each satellite channel and periodically updates the channel parameters. The channel information transmit and receive controller 1301b programs the ranging code and Doppler estimates. The Doppler estimates, for example, the Doppler shifts are used for accurately determining the orbital position of the satellite.

A dedicated satellite channel resource is present for each satellite both in the FPGA and the DSP 1301a. A signal generator 1301e comprising the modulation module 1205c of the processing unit 1205 generates the ranging code and carrier frequency that identify the satellite and the associated satellite channel, based on the pseudorange and delta-range parameters of the navigation data received over the communication interface 1206e. The modulation module 1205c applies a spreading code such as the Gold code on the navigation data samples and performs spreading of the low bit rate navigation data with a high-rate pseudorandom (PRN) code that is unique for each satellite. Further, the modulation module 1205c modulates the spread navigation data samples using a digital modulation scheme, for example, a binary phase shift keying (BPSK) modulation scheme. The specifications for generating the spread modulated navigation data samples are exemplarily illustrated in FIG. 5.

An adder 1301f sums the modulated navigation data samples from various satellite channels across different carrier frequencies and transfers the navigation data samples to a serializer/deserializer (SERDES) unit 1301g. The SERDES unit 1301g performs a parallel to serial operation on the navigation data samples to obtain the navigation data samples in a serial sequence, and communicates the navigation data samples to the digital to analog converter (DAC) 1205b. The DAC 1205b converts the navigation data samples to obtain an analog signal. The DAC 1205b translates the baseband analog signal in frequency to obtain an intermediate frequency (IF) signal. An up-converter 1205d translates the IF signal, for example, to the L5 radio frequency, that is, about 1176.45 megahertz (MHz), the S1 radio frequency, that is, about 2492.08 MHz, etc., using a heterodyning technique, to generate the radio frequency navigation signal that is to be translated over the communication interface 1201a.

Figure 14:
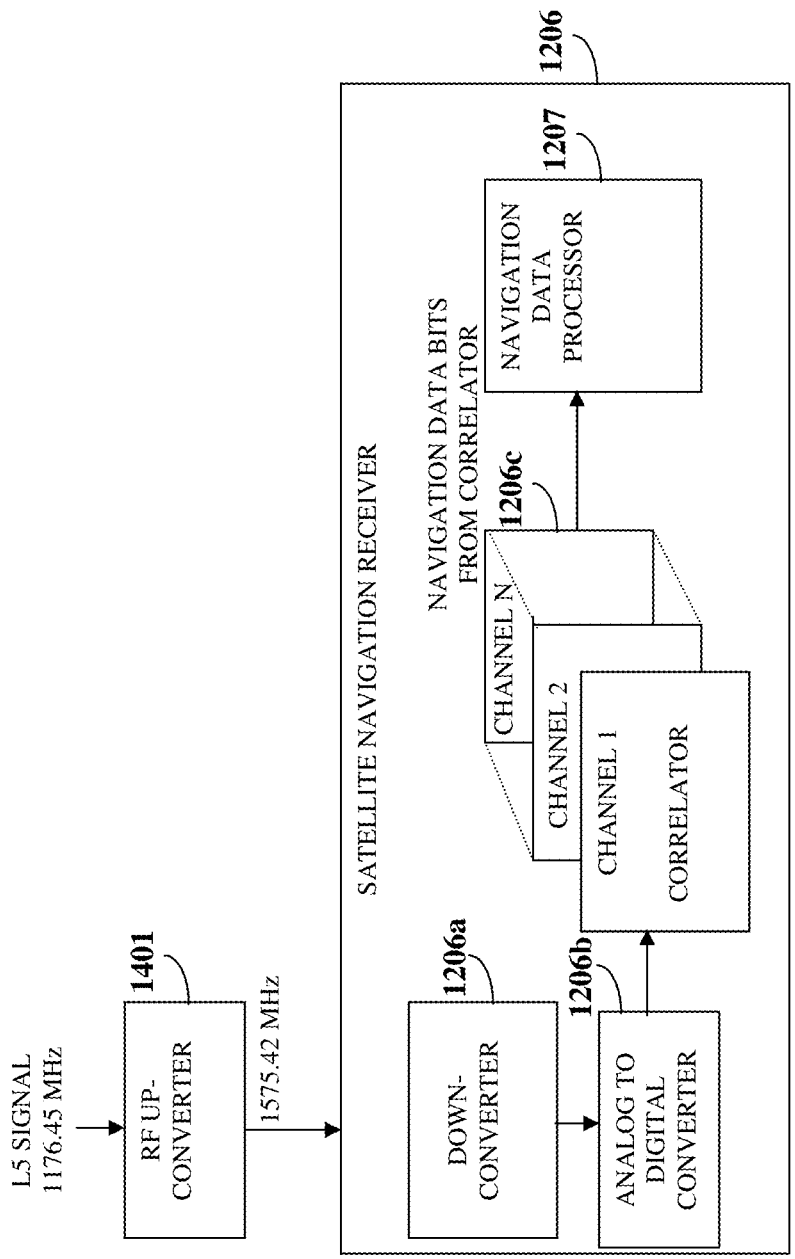
FIG. 14 exemplarily illustrates a high level block diagram of the satellite navigation receiver.

FIG. 14 exemplarily illustrates a high level block diagram of the satellite navigation receiver 1206. The satellite navigation receiver 1206 disclosed herein is capable of operating at the GPS L1 frequency. The received radio frequency navigation signal is at a frequency of 1176.45 MHz compliant with the Indian regional navigational satellite system (IRNSS). Therefore, a radio frequency (RF) up-converter 1401 is used to translate the L5 IRNSS navigation signal to the GPS L1 frequency equal to 1575.42 MHz. The up-converted navigation signal is fed to the satellite navigation receiver 1206 for further processing. The satellite navigation receiver 1206 comprises a radio frequency (RF) front-end section with a radio frequency down-converter 1206a that down converts the L1 radio frequency navigation signal to an intermediate frequency (IF) signal. The analog to digital converter 1206b performs an analog to digital conversion on the down converted IF signal to generate digital samples of the navigation data and transfers the digital samples to the correlator 1206c.

The correlator 1206c is, for example, implemented in a field programmable gate array (FPGA). The correlator 1206c performs a correlation operation, that is, the correlator 1206c compares the digital samples of the navigation data with locally generated digital samples to estimate the correlation between the expected navigation data samples and the obtained navigation data samples, and records the resulting correlation values that measure the amount of auto-correlation or cross-correlation in a correlation file. The correlator 1206c, for example, correlates the frequency of the local carrier with the frequency of the carrier in the received navigation signal samples, and checks the alignment in time of a predetermined pseudorandom number (PRN) code with the PRN code extracted from the received navigation data samples. The correlator 1206c on the FPGA transmits the correlation file to the navigation data processor 1207 which is, for example, a digital signal processor (DSP). The navigation data processor 1207 uses the result of the correlation to perform acquisition, that is, replication of the PRN code and carrier frequency, tracking of the acquired navigation data samples, and demodulation of the navigation data samples.

In addition to the correlation values detailing the amount of correlation of the navigation data samples with the locally generated digital samples, the FPGA also generates the measurement data. The navigation data processor 1207 executes a navigation algorithm for computing the position of the satellite and in turn, the position of the user. The navigation data processor 1207 transmits the result of execution of the navigation algorithm, for example, via a serial wired link using recommended standard (RS) 232 to a console, for example, a laptop provided with the graphical user interface 1206d as exemplarily illustrated in FIG. 16. The console logs the received results, for example, in a log file, and uses the results to measure the relative performance of the method and system 1200 disclosed herein with that of a conventional satellite navigation system such as the global positioning system (GPS).

Figure 15:
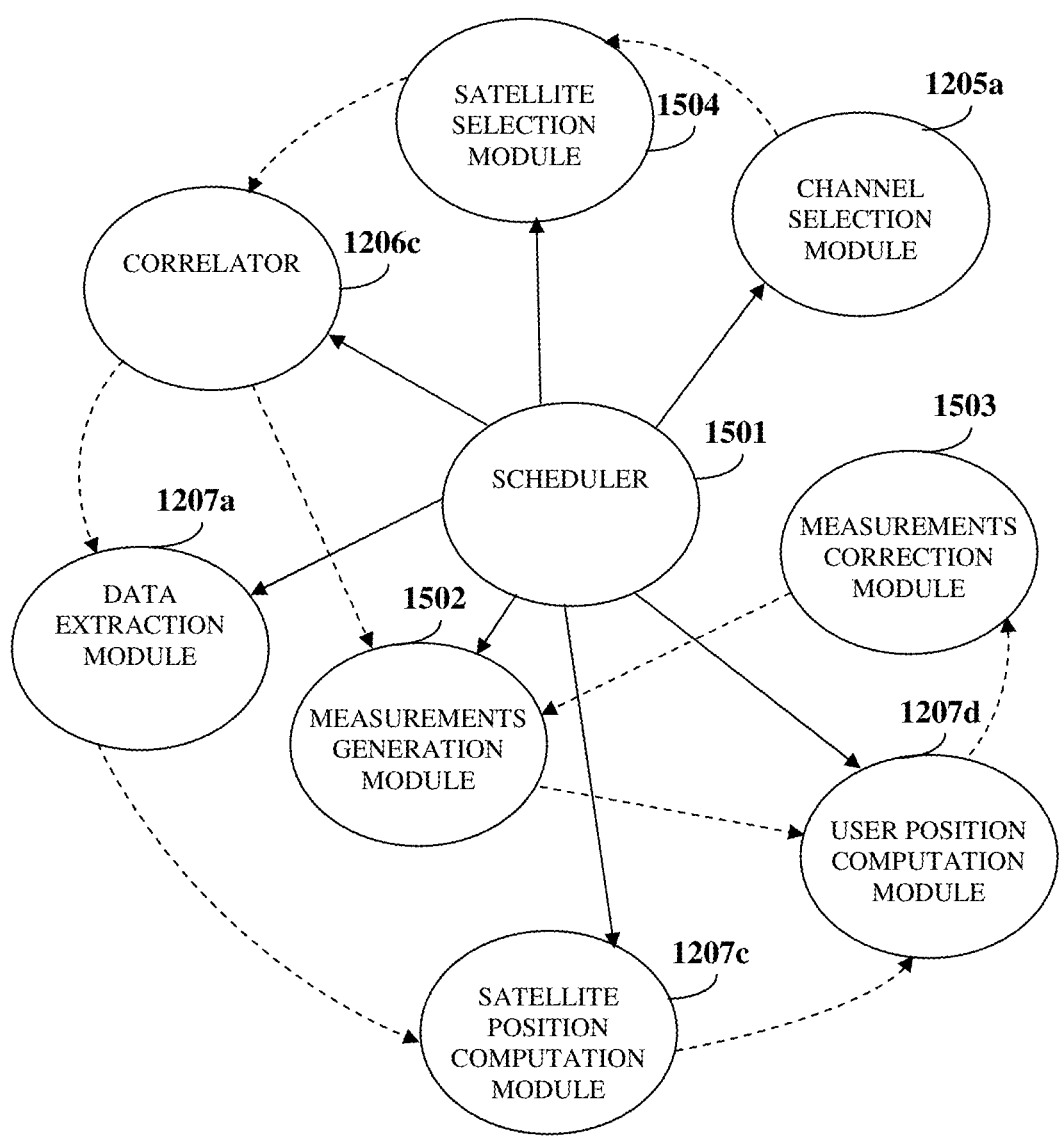
FIG. 15 exemplarily illustrates a bubble diagram of software modules of the satellite navigation receiver.

FIG. 15 exemplarily illustrates a bubble diagram of software modules of the satellite navigation receiver 1206. The satellite navigation receiver 1206 uses basic ranging codes as used in a conventional GNSS to perform acquisition and tracking. The bubble diagram comprises a scheduler 1501, the data extraction module 1207a, the satellite position computation module 1207c, the user position computation module 1207d, a measurements generation module 1502, a satellite selection module 1504, the correlator 1206c, and a measurements correction module 1503. The scheduler 1501 schedules the sequence of operations to be carried out by the satellite navigation receiver 1206 for navigation data acquisition, tracking, etc., of each satellite.

FIG. 15 also illustrates the channel selection module 1205a of the signal generation system 1201 that controls the selection of the satellite channels using the ranging code, for example, a pseudorandom number (PRN) code and the carrier frequency over which the computed measurements comprising the pseudorange measurements, the delta-range measurements, range-rate measurements, etc., are transmitted to the satellite navigation receiver 1206 exemplarily illustrated in FIG. 12 and FIG. 14. The signal generation system 1201 exemplarily illustrated in FIG. 12 communicates with the satellite navigation receiver 1206 via the communication interface 1201a. The satellite navigation receiver 1206 manages the selected satellite channels. The satellite selection module 1504 selects the satellite with which the satellite navigation receiver 1206 is in communication by selecting the ranging code and the carrier frequency of the satellite currently tracked by the satellite navigation receiver 1206. The correlator 1206c performs correlation of the received navigation data samples with the locally generated reference navigation data samples.

The data extraction module 1207a collects the correlated navigation data samples from the correlator 1206c, and extracts the ephemeris data, almanac data and the text messages from the navigation data structure. Further, the measurements generation module 1502 computes the pseudorange measurement, the delta-range measurement, etc., that enable accurate estimation of the position of the user. The measurements correction module 1503 computes the corrections based on the ionosphere delay coefficients present in the almanac data, etc. The satellite position computation module 1207c computes the position fix of the satellite, that is, the coordinates of the satellite based on the extracted navigation data, and the measurements, and outputs the satellite vectors, that is, the position coordinates of the satellite. The user position computation module 1207d computes the geographical position comprising the latitude, longitude, altitude, velocity, etc., of the user by applying a navigation algorithm, for example, a triangulation algorithm, on the satellite vectors of all visible satellites.

FIG. 16 exemplarily illustrates a screenshot of a graphical user interface 1206d of the satellite navigation receiver 1206 that enables profiling of navigation data and determination of a geographical position of a user. The graphical user interface (GUI) 1206d of the satellite navigation receiver 1206 is used for profiling navigation data measurements, the status of reception of the navigation data, health parameters of a satellite being tracked, etc. The GUI 1206d, for example, displays individual satellite identifiers, acquisition and tracking status with reference to the collection of the navigation data, the constellation number, position coordinates of the satellite with reference to the earth-centered, earth-fixed (ECEF) coordinate system, a geographical position of a user, that is, the latitude, longitude, and altitude of the user, the time to first fix (TTFF), the geographical position of the user such as the latitude, longitude, and altitude of the user, etc.

Figure 17:
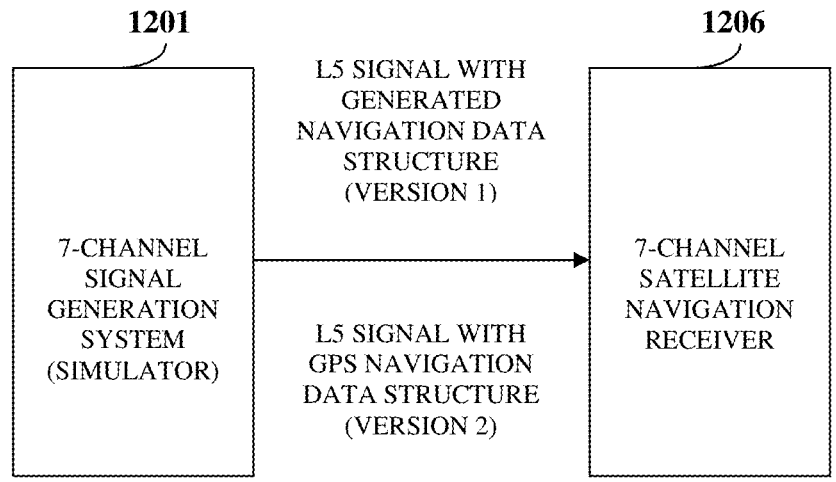
FIG. 17 exemplarily illustrates a test apparatus used for performing a comparative analysis of the time to first fix determined using the system disclosed herein and a global positioning system (GPS) based system.

FIG. 17 exemplarily illustrates a test apparatus used for performing a comparative analysis of the time to first fix determined using the system 1200 disclosed herein and a global positioning system (GPS) based system. The test apparatus comprises the signal generation system 1201 and the satellite navigation receiver 1206 of the system 1200 exemplarily illustrated in FIG. 12. A seven-channel IRNSS based single frequency satellite navigation receiver 1206 is used for comparing the TTFF performance of the satellite navigation receiver 1206 deploying the navigation data structure disclosed herein with a GPS based system that deploys the conventional five sub-frame navigation data structure. The signal generation system 1201 and the satellite navigation receiver 1206 are used to test the generated navigation data. The signal generation system 1201 and the satellite navigation receiver 1206 support processing on seven satellite channels simultaneously. The input signals comprise an L5 radio frequency navigation signal with the navigation data structure disclosed herein, and an L5 radio frequency navigation signal with the navigation data structure of a conventional global positioning system (GPS) based system.

Figure 18:
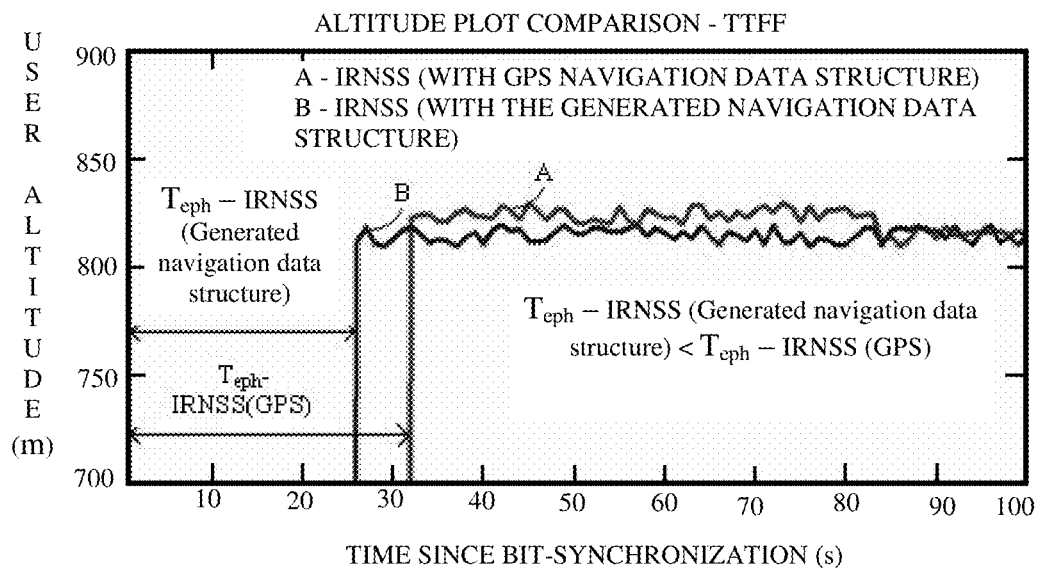
FIG. 18 exemplarily illustrates a graphical representation showing a comparative analysis of collection time of ephemeris data determined using the system disclosed herein and a global positioning system (GPS) based system.

FIG. 18 exemplarily illustrates a graphical representation showing a comparative analysis of collection time of ephemeris data determined using the system 1200 disclosed herein and a global positioning system (GPS) based system. The test apparatus exemplarily illustrated in FIG. 17 is used for performing the comparative analysis of collection time of ephemeris data. An altitude plot depicting the time required by the satellite navigation receiver 1206 for estimating the altitude of the user is selected to obtain an understanding of the effect of the navigation data structure disclosed herein on the time for collecting the ephemeris data by the satellite navigation receiver 1206. The altitude plot enables testing of the relative performance in terms of the TTFF using the method and system 1200 disclosed herein when compared to the conventional GPS based system. To test the relative performance, the operation of the satellite navigation receiver 1206 is tested independently. In a first version, the four sub-frame navigation data structure is simulated by the signal generation system 1201 and the performance of the satellite navigation receiver 1206 is tested accordingly. In a second version, satellites with navigation (NAV) data according to the five sub-frame navigation data structure is generated and tested. The TTFF from both the versions is logged for several runs and displayed using the graphical user interface 1206*d*.

Figures 19, 20:
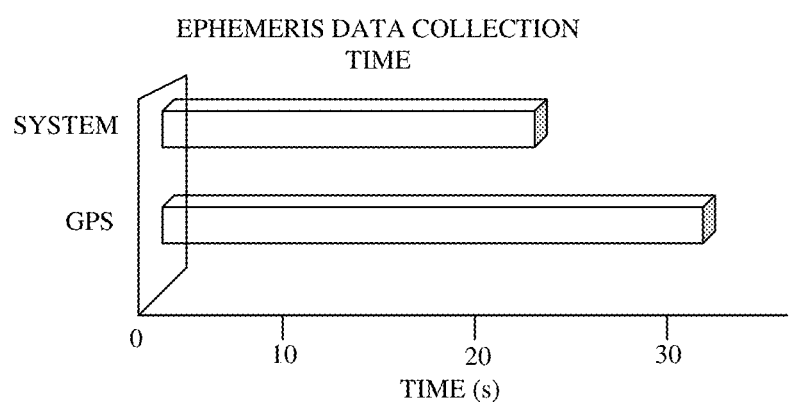
FIG. 19 exemplarily illustrates a table showing comparison of the collection time of ephemeris data determined using the system disclosed herein and a global positioning system (GPS) based system.
FIG. 20 exemplarily illustrates a bar graph showing a comparative analysis of collection time of ephemeris data determined using the system disclosed herein and a global positioning system (GPS) based system.

FIG. 19 exemplarily illustrates a table showing comparison of the collection time of ephemeris data determined using the system 1200 disclosed herein and a global positioning system (GPS) based system. The table indicates the time for collection of the ephemeris data as a function of the sub-frame synchronization. The table indicates the individual sub-frames of the navigation data structure as identified by the sub-frame identifier, and the ephemeris data collection time for the GPS based system and the system 1200 disclosed herein.

FIG. 20 exemplarily illustrates a bar graph showing a comparative analysis of collection time of ephemeris data determined using the system 1200 disclosed herein and a global positioning system (GPS) based system. The test apparatus exemplarily illustrated in FIG. 17 is used for performing the comparative analysis of collection time of the ephemeris data. The bar graph indicates the improvement in the ephemeris time $T_{eph}$ gained from the navigation data structure generated by the system 1200 disclosed herein, when compared with the standard GPS based system. As indicated in the bar graph, the generation of the navigation data structure disclosed herein results in a reduction of the time required for collecting the ephemeris data. For example, the time required for collecting the ephemeris data is, for example, about 24 seconds on deploying the navigation data structure generated by the system 1200 disclosed herein, and about 30 seconds when deploying a conventional navigation data structure of the GPS based system. This translates, for example, to about a twenty percent improvement in TTFF for a single frequency user when using the generated navigation data structure.

Figure 21:
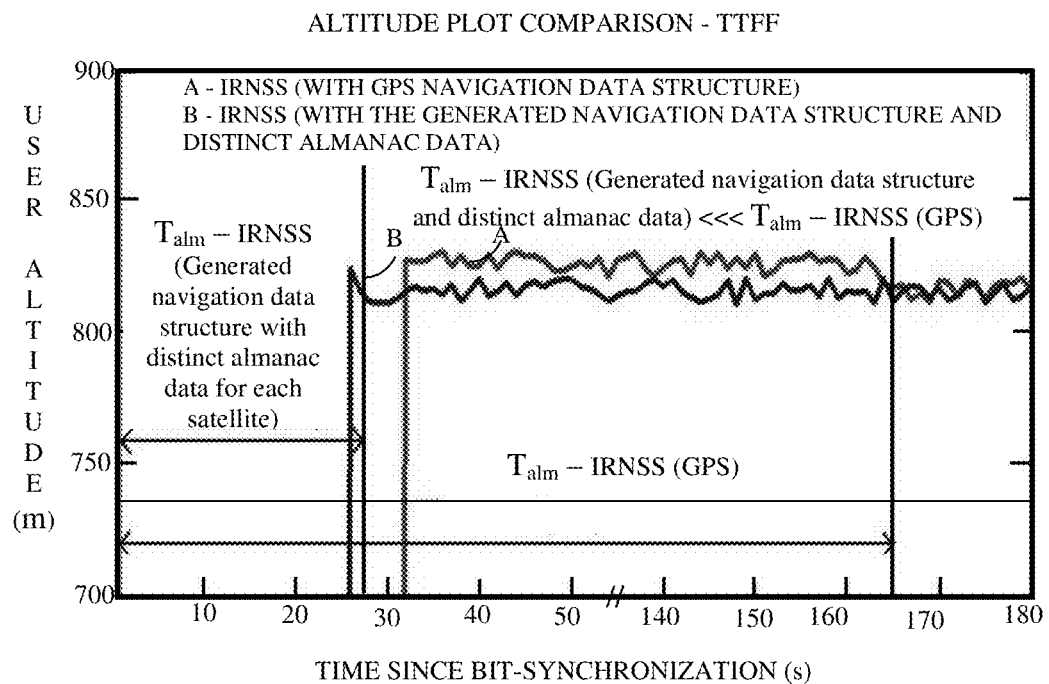
FIG. 21 exemplarily illustrates a graphical representation showing a comparative analysis of collection time of almanac data determined using the system disclosed herein and a global positioning system (GPS) based system.

FIG. 21 exemplarily illustrates a graphical representation showing a comparative analysis of collection time of almanac data determined using the system 1200 disclosed herein and a global positioning system (GPS) based system. The test apparatus exemplarily illustrated in FIG. 17 is used for performing the comparative analysis of collection time of almanac data. The graphical representation illustrates the relative performance of collection time of almanac data using the system 1200 disclosed herein and the GPS based system. The signal generation system 1201 and the single frequency satellite navigation receiver 1206 are used for testing the performance in terms of the almanac data collection time, $T_{alm}$. A simulated ionosphere error is introduced in the navigation signals based on the Klobochur model for each satellite. The single frequency satellite navigation receiver 1206 performs collection of the almanac data with the simulated radio frequency navigation signal. The resultant time for collecting the almanac data is logged using the GUI 1206*d*. The absolute position, that is, the altitude of the user is plotted and compared with the simulated value.

The satellite navigation receiver 1206 initially has a finite error; however, the error is reduced by applying corrections to measurements based on ionosphere modeling during the collection of the almanac data. The time taken to apply the ionosphere correction using the ionosphere coefficients contained in the almanac data is used for performing the comparative analysis between the system 1200 disclosed herein and the GPS based system. The satellite navigation receiver 1206 generates an altitude plot depicting the time required by the single frequency satellite navigation receiver 1206 for estimating the geographical position of the user in terms of the altitude of the user, using the almanac data received by the single frequency satellite navigation receiver 1206. The altitude plot illustrates the improvement in the performance of the single frequency satellite navigation receiver 1206 with reference to the time taken to estimate the geographical position, that is, the altitude of the user using the system 1200 disclosed herein and the GPS based system.

Figure 22:
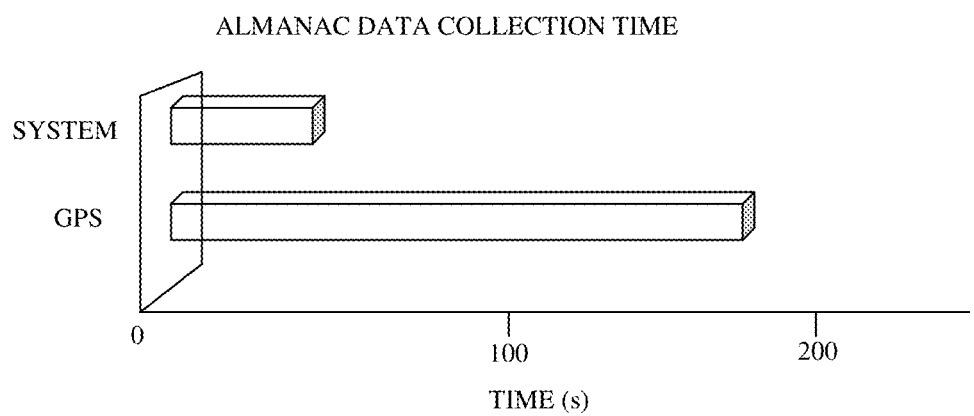
FIG. 22 exemplarily illustrates a bar graph showing a comparative analysis of collection time of almanac data determined using the system disclosed herein and a global positioning system (GPS) based system.

FIG. 22 exemplarily illustrates a bar graph showing a comparative analysis of collection time of almanac data determined using the system 1200 disclosed herein and a global positioning system (GPS) based system. The test apparatus exemplarily illustrated in FIG. 17 is used for performing the comparative analysis of collection time of the almanac data. The improvement in the collection time $T_{alm}$ of the almanac data is illustrated in the bar graph. As indicated in the bar graph, the time for collection of the almanac data is about 168 seconds in case of the GPS based system and 24 seconds in case of the system 1200 disclosed herein. This translates, for example, to about an 86% improvement in the almanac collection time for a single frequency user.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire and fiber optics, including wires that constitute a system bus coupled to a processor. Common forms of computer readable media comprise, for example, a floppy disk, a flexible disk, a hard disk, magnetic tape, any other magnetic medium, a compact disc-read only memory (CD-ROM), a digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, digital signal processors or like devices. Typically, a processor receives instructions from a memory or like device and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of languages that can be used comprise C, C++, C#, Perl, Python, or JAVA. The computer program codes or software programs may be stored on or in one or more mediums as object code. The computer program product disclosed herein comprises computer executable instructions embodied in a non-transitory computer readable storage medium, wherein the computer program product comprises computer program codes for implementing the processes of various embodiments.

The present invention can be configured to work in a network environment including a computer that is in communication with one or more devices via a communication network. The computer may communicate with the devices directly or indirectly, via a wired medium or a wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, Sun® processors, IBM® processors, etc., that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A method of transmitting a navigation signal comprising navigation data to a satellite navigation receiver, comprising:
    providing a signal generation system in each of a plurality of navigation satellites, wherein said signal generation system comprises a data generation unit and a processing unit;
    generating characteristic measurements of each of said plurality of navigation satellites, by a measurements module within said data generation unit;
    generating a navigation data structure using said generated characteristic measurements, by said data generation unit, wherein said navigation data structure comprises:
        a first sub-frame and a second sub-frame configured for accommodating ephemeris data of said navigation data;
        a third sub-frame configured for accommodating a first set of almanac data, wherein said first set of almanac data comprises Keplerian parameters and ionosphere coefficients; and
        a fourth sub-frame configured for accommodating a text message comprising a second set of said almanac data, wherein said second set of said almanac data comprises one or more of coordinated universal time parameters, and periodic non-positioning information extracted from said first sub-frame, said second sub-frame, and said third sub-frame;
    processing said generated navigation data structure, by said processing unit, to generate said navigation signal; and
    transmitting said generated navigation signal, by said processing unit, to said satellite navigation receiver, via a communication interface.

2. The method of claim 1, wherein each of said plurality of navigation satellites transmits said first data frame, said second data frame, said third data frame, and said fourth data frame using a predetermined pseudo random sequence unique to each of said navigation satellites.

3. The method of claim 1, wherein said generation of said navigation data structure comprises appending a synchronization word to each of said first sub-frame, said second sub-frame, said third sub-frame, and said fourth sub-frame for enabling frame synchronization and identification of a sub-frame boundary of said each of said first sub-frame, said second sub-frame, said third sub-frame, and said fourth sub-frame.

4. The method of claim 1, wherein each of said first sub-frame, said second sub-frame, said third sub-frame, and said fourth sub-frame comprises 245 bits of said navigation data and 24 bits of a cyclic redundancy check code for enabling validation of said navigation data.

5. A method of processing navigation data by a satellite navigation receiver, comprising:
    receiving a navigation signal transmitted from a plurality of navigation satellites, wherein said navigation signal comprises navigation data in a navigation data structure, wherein said navigation data structure comprises:
        a first sub-frame and a second sub-frame configured for accommodating ephemeris data of said navigation data;
        a third sub-frame configured for accommodating a first set of almanac data, wherein said first set of almanac data comprises Keplerian parameters and ionosphere coefficients; and
        a fourth sub-frame configured for accommodating a text message comprising a second set of said almanac data, wherein said second set of said almanac data comprises one or more of coordinated universal time parameters, and periodic non-positioning information extracted from said first sub-frame, said second sub-frame, and said third sub-frame;
    determining a sub-frame boundary of each of said first sub-frame, said second sub-frame, said third sub-frame, and said fourth sub-frame in said generated navigation data structure by searching for a synchronization word in said generated navigation data structure;
    decoding said each of said first sub-frame, said second sub-frame, said third sub-frame, and said fourth sub-frame in said generated navigation data structure for extracting said navigation data;
    performing a cyclic redundancy check operation on said extracted navigation data for validating said extracted navigation data; and
    extracting said ephemeris data, said first set of said almanac data, and said text message comprising said second set of said almanac data from said validated navigation data based on a sub-frame identifier.

6. The method of claim 5, further comprising:
analyzing timing components that constitute a time to first fix by said satellite navigation receiver, and identifying timing delays at said satellite navigation receiver, wherein said timing components comprise:
- a time for boot-up of said satellite navigation receiver;
- a time for acquiring coarse estimates of a code phase and a carrier Doppler frequency of visible satellites of a constellation over satellite channels corresponding to said visible satellites;
- a time for performing bit synchronization of said satellite channels corresponding to said visible satellites;
- a time for extracting said navigation data from said generated navigation data structure contained in navigation signals received from said visible satellites by said satellite navigation receiver; and
- a time for computing a geographical position of a user based on said extracted navigation data.

7. The method of claim 5, further comprising processing said extracted ephemeris data, said first set of said almanac data, and said text message comprising said second set of said almanac data for determining positions of each of said plurality of navigation satellites for estimating a geographical position of a user.

8. A signal generation system for transmitting a navigation signal comprising navigation data to a satellite navigation receiver, comprising:
a data generation unit comprising:
- a measurements module that generates characteristic measurements of each satellite of a constellation; and
- a navigation data generation module that generates a navigation data structure using said generated characteristic measurements, wherein said generated navigation data structure comprises:
  - a first sub-frame and a second sub-frame configured for accommodating ephemeris data of said navigation data;
  - a third sub-frame configured for accommodating a first set of almanac data of said navigation data, wherein said first set of almanac data comprises Keplerian parameters and ionosphere coefficients; and
  - a fourth sub-frame configured for accommodating a text message comprising a second set of said almanac data, wherein said second set of said almanac data comprises one or more of coordinated universal time parameters, and periodic non-positioning information extracted from said first sub-frame, said second sub-frame, and said third sub-frame; and
a processing unit that processes said generated navigation data structure comprising said ephemeris data, said first set of said almanac data, and said second set of said almanac data to generate said navigation signal, wherein said processing unit transmits said generated navigation signal to said satellite navigation receiver.

9. The signal generation system of claim 8, wherein said processing unit comprises:
a modulation module that generates a carrier frequency and a ranging code for a satellite channel associated with said each satellite over which said generated navigation signal is to be transmitted;
said modulation module that modulates said navigation data in said generated navigation data structure with said generated carrier frequency and said generated ranging code to generate an intermediate frequency signal; and
an up-converter that translates said intermediate frequency signal to generate said navigation signal.

10. The signal generation system of claim 8, wherein said characteristic measurements comprise pseudorange measurements and delta-range measurements.

11. The signal generation system of claim 8, wherein said navigation data generation module of said data generation unit comprises:
- a sub-frame generation module that generates said first sub-frame, said second sub-frame, said third sub-frame, and said fourth sub-frame using said selective ephemeris data, said almanac data, and said text message extrapolated from preconfigured navigation data files associated with said each satellite;
- a cyclic redundancy check module that computes cyclic redundancy check bits for each of said first sub-frame, said second sub-frame, said third sub-frame, and said fourth sub-frame, for enabling validation of said navigation data; and
- an encoder that applies a forward error correcting code to said navigation data for encoding each said first sub-frame, said second sub-frame, said third sub-frame, and said fourth sub-frame, and generating symbols of said navigation data.

12. A satellite navigation receiver for processing navigation data within a navigation data structure contained in a navigation signal received from a plurality of navigation satellites, comprising:
a navigation data processor, said navigation data processor comprising:
- a data extraction module configured for extracting said navigation data from said navigation data structure contained in said navigation signal transmitted by said plurality of navigation satellites, wherein said navigation data structure comprises:
  - a first sub-frame and a second sub-frame configured for accommodating ephemeris data of said navigation data;
  - a third sub-frame configured for accommodating a first set of almanac data, wherein said first set of almanac data comprises Keplerian parameters and ionosphere coefficients; and
  - a fourth sub-frame configured for accommodating a text message comprising a second set of said almanac data, wherein said second set of said almanac data comprises one or more of coordinated universal time parameters, and periodic non-positioning information extracted from said first sub-frame, said second sub-frame, and said third sub-frame;
- said data extraction module further configured for determining a sub-frame boundary of each of said first sub-frame, said second sub-frame, said third sub-frame, and said fourth sub-frame in said generated navigation data structure by searching for a synchronization word in said generated navigation data structure;
- said data extraction module further configured for decoding said each of said first sub-frame, said second sub-frame, said third sub-frame, and said fourth sub-frame in said generated navigation data structure for extracting said navigation data;
- said data extraction module further configured for performing a cyclic redundancy check operation on said extracted navigation data for validating said extracted navigation data;
- said data extraction module further configured for extracting said ephemeris data, said first set of said almanac data, and said text message comprising said second set of said almanac data from said validated navigation data based on a sub-frame identifier; and a position computation module for processing said extracted ephemeris data, said first set of said almanac data, and said text message comprising said second set of said almanac data for determining positions of each of said plurality of navigation satellites for estimating a geographical position of a user.

13. The satellite navigation receiver of claim 12, further comprising:

a time analysis module for analyzing timing components that constitute a time to first fix by said satellite navigation receiver, and identifying timing delays at said satellite navigation receiver, wherein said timing components comprise:
  a time for boot-up of said satellite navigation receiver;
  a time for acquiring coarse estimates of a code phase and a carrier Doppler frequency of visible satellites of a constellation over satellite channels corresponding to said visible satellites;
  a time for performing bit synchronization of said satellite channels corresponding to said visible satellites;
  a time for extracting said navigation data from said generated navigation data structure contained in navigation signals received from said visible satellites by said satellite navigation receiver; and
  a time for computing a geographical position of a user based on said extracted navigation data.

14. A computer program product comprising a non-transitory computer readable storage medium, said non-transitory computer readable storage medium storing computer program codes that comprise instructions executable by at least one processor, said computer program codes comprising:

a first computer program code configured for execution by at least one processor of a signal generation system, said first computer program code configured for:
  generating characteristic measurements of each of said plurality of navigation satellites;
  generating a navigation data structure, wherein said navigation data structure comprises:
    a first sub-frame and a second sub-frame configured for accommodating ephemeris data of said navigation data;
    a third sub-frame configured for accommodating a first set of almanac data, wherein said first set of almanac data comprises Keplerian parameters and ionosphere coefficients; and
    a fourth sub-frame configured for accommodating a text message comprising a second set of said almanac data, wherein said second set of said almanac data comprises one or more of coordinated universal time parameters, and periodic non-positioning information extracted from said first sub-frame, said second sub-frame, and said third sub-frame;
  processing said generated navigation data structure, to generate said navigation signal: and
  transmitting said generated navigation signal, to said satellite navigation receiver, via a communication interface;

a second computer program code configured for execution by at least one processor of a satellite navigation receiver, said second computer program code configured for:
  receiving a navigation signal transmitted from a plurality of navigation satellites, wherein said navigation signal comprises navigation data in a navigation data structure, wherein said navigation data structure comprises:
    a first sub-frame and a second sub-frame configured for accommodating ephemeris data of said navigation data;
    a third sub-frame configured for accommodating a first set of almanac data, wherein said first set of almanac data comprises Keplerian parameters and ionosphere coefficients; and
    a fourth sub-frame configured for accommodating a text message comprising a second set of said almanac data, wherein said second set of said almanac data comprises one or more of coordinated universal time parameters, and periodic non-positioning information extracted from said first sub-frame, said second sub-frame, and said third sub-frame;
  determining a sub-frame boundary of each of said first sub-frame, said second sub-frame, said third sub-frame, and said fourth sub-frame in said generated navigation data structure by searching for a synchronization word in said generated navigation data structure;
  decoding said each of said first sub-frame, said second sub-frame, said third sub-frame, and said fourth sub-frame in said generated navigation data structure for extracting said navigation data;
  performing a cyclic redundancy check operation on said extracted navigation data for validating said extracted navigation data; and
  extracting said ephemeris data, said first set of said almanac data, and said text message comprising said second set of said almanac data from said validated navigation data based on a sub-frame identifier.

* * * * *